US010410333B2

(12) United States Patent
Takenaka et al.

(10) Patent No.: US 10,410,333 B2
(45) Date of Patent: Sep. 10, 2019

(54) PRODUCT MONITORING DEVICE, PRODUCT MONITORING SYSTEM, AND PRODUCT MONITORING METHOD

(71) Applicant: PANASONIC INTELLECTUAL PROPERTY MANAGEMENT CO., LTD., Osaka (JP)

(72) Inventors: Shinji Takenaka, Ishikawa (JP); Kenji Tokuda, Ishikawa (JP); Yuichiro Takemoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/565,808

(22) PCT Filed: Mar. 3, 2016

(86) PCT No.: PCT/JP2016/001159
§ 371 (c)(1),
(2) Date: Oct. 11, 2017

(87) PCT Pub. No.: WO2016/174804
PCT Pub. Date: Nov. 3, 2016

(65) Prior Publication Data
US 2018/0122062 A1 May 3, 2018

(30) Foreign Application Priority Data

Apr. 28, 2015 (JP) ................................. 2015-091956

(51) Int. Cl.
*G06K 9/00* (2006.01)
*G06T 7/00* (2017.01)
(Continued)

(52) U.S. Cl.
CPC ........ *G06T 7/0004* (2013.01); *G06K 9/00771* (2013.01); *G06Q 10/087* (2013.01);
(Continued)

(58) Field of Classification Search
None
See application file for complete search history.

(56) References Cited

U.S. PATENT DOCUMENTS 8,325,036 B1 * 12/2012 Fuhr .................... G06Q 10/087
340/5.92
9,971,939 B2 * 5/2018 Sawada .............. G06K 9/00624
(Continued)

FOREIGN PATENT DOCUMENTS

JP      3908047 B2    4/2007
JP      4473676 B2    6/2010
(Continued)

OTHER PUBLICATIONS

International Search Report and Written Opinion issued in WIPO Patent Application No. PCT/JP2016/001159, dated May 31, 2016.

*Primary Examiner* — Samah A Beg
(74) *Attorney, Agent, or Firm* — Greenblum & Bernstein, P.L.C.

(57) ABSTRACT

A product monitoring device is provided that presents, to the user, information by which the user can recognize specific work items of a product management work for improving an inappropriate display state. The product monitoring device acquires a captured image of a display area, sets a state monitoring area on the captured image of the display area, acquires product detection information indicating a position of a product in the state monitoring area, based on a captured image of the state monitoring area, evaluates a display state of the product in the state monitoring area, using a plurality of evaluation indices relating to display disorder of the product, based on the product detection information, and presents information on an evaluation result to a user.

9 Claims, 16 Drawing Sheets

(51) Int. Cl.
*G06Q 30/06* (2012.01)
*G06Q 10/08* (2012.01)
*G06T 7/60* (2017.01)
*H04N 5/262* (2006.01)
*G06T 7/70* (2017.01)
*G06T 7/62* (2017.01)
*G06K 9/38* (2006.01)

(52) U.S. Cl.
CPC ............ *G06Q 30/06* (2013.01); *G06T 7/60* (2013.01); *G06T 7/62* (2017.01); *G06T 7/70* (2017.01); *H04N 5/2621* (2013.01); *G06K 9/38* (2013.01); *G06T 2207/20021* (2013.01); *G06T 2207/20068* (2013.01); *G06T 2207/20076* (2013.01); *G06T 2207/20104* (2013.01); *G06T 2207/30196* (2013.01); *G06T 2207/30232* (2013.01)

(56) References Cited

U.S. PATENT DOCUMENTS

| | | | | |
|---|---|---|---|---|
| 2006/0235734 | A1* | 10/2006 | Dale | G06Q 10/06315 705/7.25 |
| 2007/0239569 | A1* | 10/2007 | Lucas | G06Q 10/08 705/28 |
| 2007/0260429 | A1* | 11/2007 | Vera | G08B 13/1961 702/188 |
| 2013/0339090 | A1* | 12/2013 | Placidi | G06Q 10/087 705/7.31 |
| 2014/0009614 | A1* | 1/2014 | Yoon | G06K 9/00791 348/148 |
| 2015/0063647 | A1* | 3/2015 | Ryu | G06K 9/00805 382/104 |
| 2015/0304611 | A1* | 10/2015 | Nakase | G06K 7/10415 348/143 |
| 2017/0017840 | A1* | 1/2017 | Higa | G06Q 30/06 |
| 2017/0372159 | A1* | 12/2017 | Schimmel | G06T 7/11 |
| 2018/0114184 | A1* | 4/2018 | Brooks | G01G 23/18 |
| 2018/0165711 | A1* | 6/2018 | Montemayor | G06Q 30/0255 |
| 2018/0178780 | A1* | 6/2018 | Hwang | B60W 30/06 |
| 2018/0211205 | A1* | 7/2018 | Takemoto | G06Q 30/06 |
| 2018/0247255 | A1* | 8/2018 | Jones | G06Q 10/087 |

FOREIGN PATENT DOCUMENTS

| | | | |
|---|---|---|---|
| JP | 2011-077981 A | | 4/2011 |
| JP | 2013-143655 A | | 7/2013 |
| JP | 2014-186550 A | | 10/2014 |
| JP | WO2015136847 A1 * | 4/2017 | ............ G06Q 30/06 |

\* cited by examiner

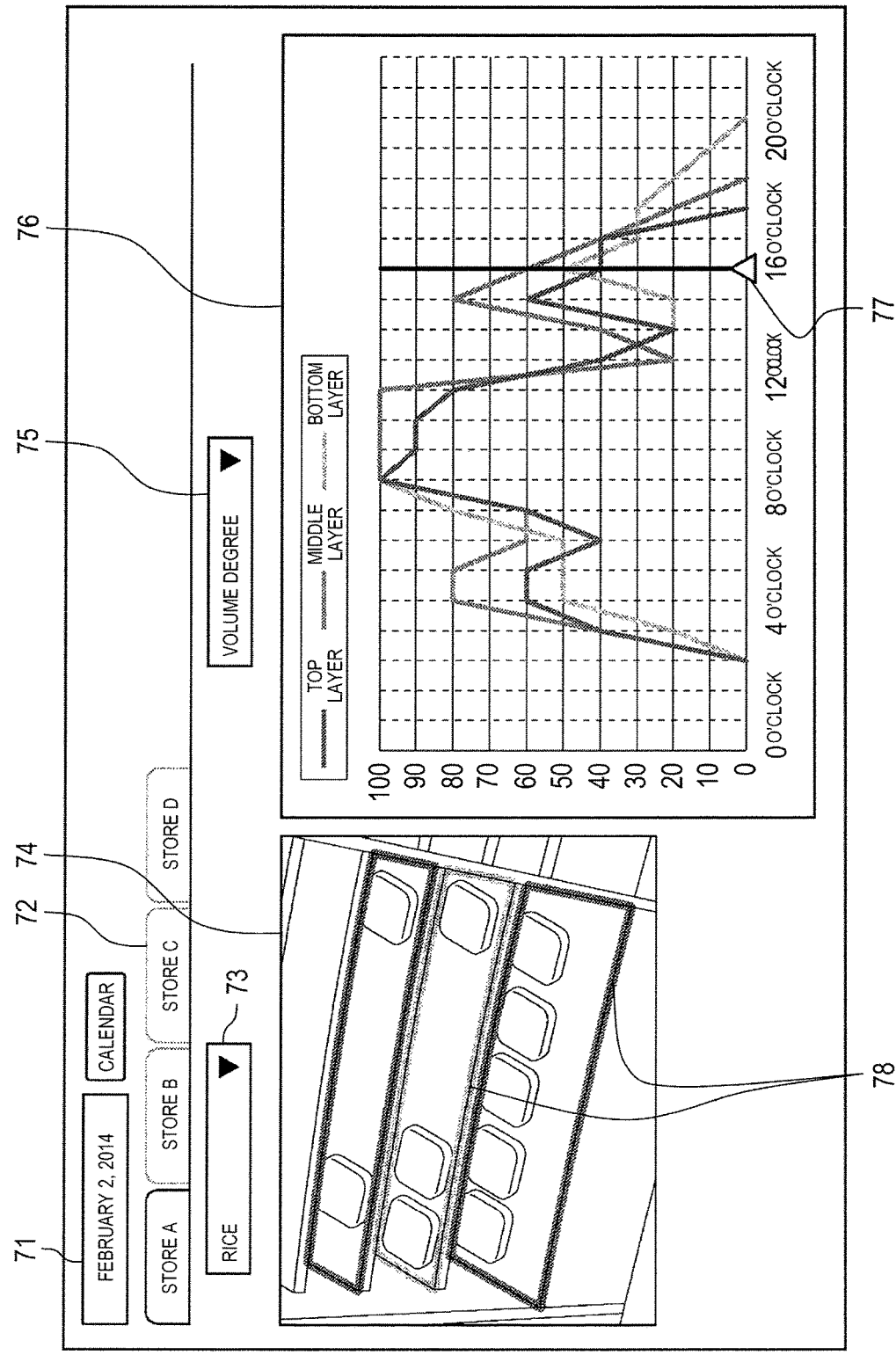

PRODUCT MONITORING DEVICE, PRODUCT MONITORING SYSTEM, AND PRODUCT MONITORING METHOD

TECHNICAL FIELD

The present disclosure relates to a product monitoring device, a product monitoring system, and a product monitoring method, which monitor a display status of a product, based on a captured image of a display area in a store.

BACKGROUND ART

In stores such as convenience stores, loss occurs at an opportunity if there is a defect in the display state of a product displayed on display shelves, that is, the display of a product is disturbed or there is a shortage of a product, and this opportunity loss has a significant impact on sales in the store, such that in a case where there is a defect in the display state of a product, it is necessary to promptly implement a product management work (an arranging work or a replenishing work) to resolve the defect.

As a technique relating to such a product management work, in the related art, a technique is known which determines necessity of the product management work, based on the captured image of a display area and makes a notification instructing a product arranging work (see PTLs 1 and 2). In particular, in the technique disclosed in PTL 1, a reference display pattern is set based on the display state of a desired product, the reference display pattern and the actual display state of a product are compared, and the display state of the product may be evaluated, based on the similarity between them. In the technique disclosed in PTL 2, a representative shape to be inserted between a boundary line that defines the outer edge of the product present region and a boundary line of a product absence region in the inside of the above boundary line is obtained, and the degree of appropriateness (face-up degree) of the display state of the product is calculated based on the area of the representative shape.

CITATION LIST

Patent Literature

PTL 1: Japanese Patent No. 3908047
PTL 2: Japanese Patent No. 4473676

SUMMARY OF THE INVENTION

However, in the related art, an inappropriate display state of a product including both a state where product display is disturbed and a state where there is a shortage of a product is comprehensively determined, and the user can recognize the necessity of a work to improve the inappropriate display state of a product, but there is a problem that it is difficult to specifically recognize a required work.

For example, in the time zone immediately before products are loaded into the store, since the inventory in the store is low, a product replenishment work cannot be performed sufficiently but a product arranging work can be performed, such that it is desired to perform a product arranging work, for example, a work of increasing a so-called sense of volume in order to reduce the leftover impression of a product, but in the related art, there is a problem that the user cannot recognize such specific work items.

The present disclosure has been devised to solve such problems in the related art, and the main purpose is to provide a product monitoring device, a product monitoring system, and a product monitoring method, which are configured so as to be able to present to the user, information by which the user can recognize specific work items of a product management work for improving an inappropriate display state, based on the captured image of the interior of the store.

A product monitoring device of the present disclosure is a product monitoring device which monitors a display status of a product, based on a captured image of a display area in a store, and is configured to include an image acquirer that acquires the captured image of the display area, a state monitoring area setter that sets a state monitoring area on the captured image of the display area, a product detector that acquires product detection information indicating a position of a product in the state monitoring area, based on a captured image of the state monitoring area, a display state evaluator that evaluates a display state of the product in the state monitoring area, using a plurality of evaluation indices relating to display disorder of the product, based on the product detection information, and an evaluation information presentation unit that presents information on an evaluation result by the display state evaluator to a user.

A product monitoring system of the present disclosure is a product monitoring system which monitors a display status of a product, based on a captured image of a display area in a store, and is configured to include a camera that captures an image of the display area, and a plurality of information processing devices, in which one of the plurality of information processing device includes an image acquirer that acquires the captured image of the display area, a state monitoring area setter that sets a state monitoring area on the captured image of the display area, a product detector that acquires product detection information indicating a position of a product in the state monitoring area, based on a captured image of the state monitoring area, a display state evaluator that evaluates a display state of the product in the state monitoring area, using a plurality of evaluation indices relating to display disorder of the product, based on the product detection information, and an evaluation information presentation unit that presents information on an evaluation result by the display state evaluator to a user.

A product monitoring method of the present disclosure is a product monitoring method causing an information processing device to implement a process of monitoring a display status of a product, based on a captured image of a display area in a store, and is configured to include a step of acquiring the captured image of the display area, a step of setting a state monitoring area on the captured image of the display area, a step of acquiring product detection information indicating a position of the product in the state monitoring area, based on a captured image of the state monitoring area, a step of evaluating a display state of the product in the state monitoring area, using a plurality of evaluation indices relating to display disorder of the product, based on the product detection information, and a step of presenting information on an evaluation result generated in the step to a user.

According to the present disclosure, since the evaluation result based on a plurality of evaluation indices regarding the display disorder of products is presented to the user, the user can recognize specific work items of the product management work for improving the inappropriate display state.

BRIEF DESCRIPTION OF DRAWINGS

FIG. 16 is an explanatory diagram illustrating an analysis information display screen displayed on monitor 7.

DESCRIPTION OF EMBODIMENT

Figure 1:
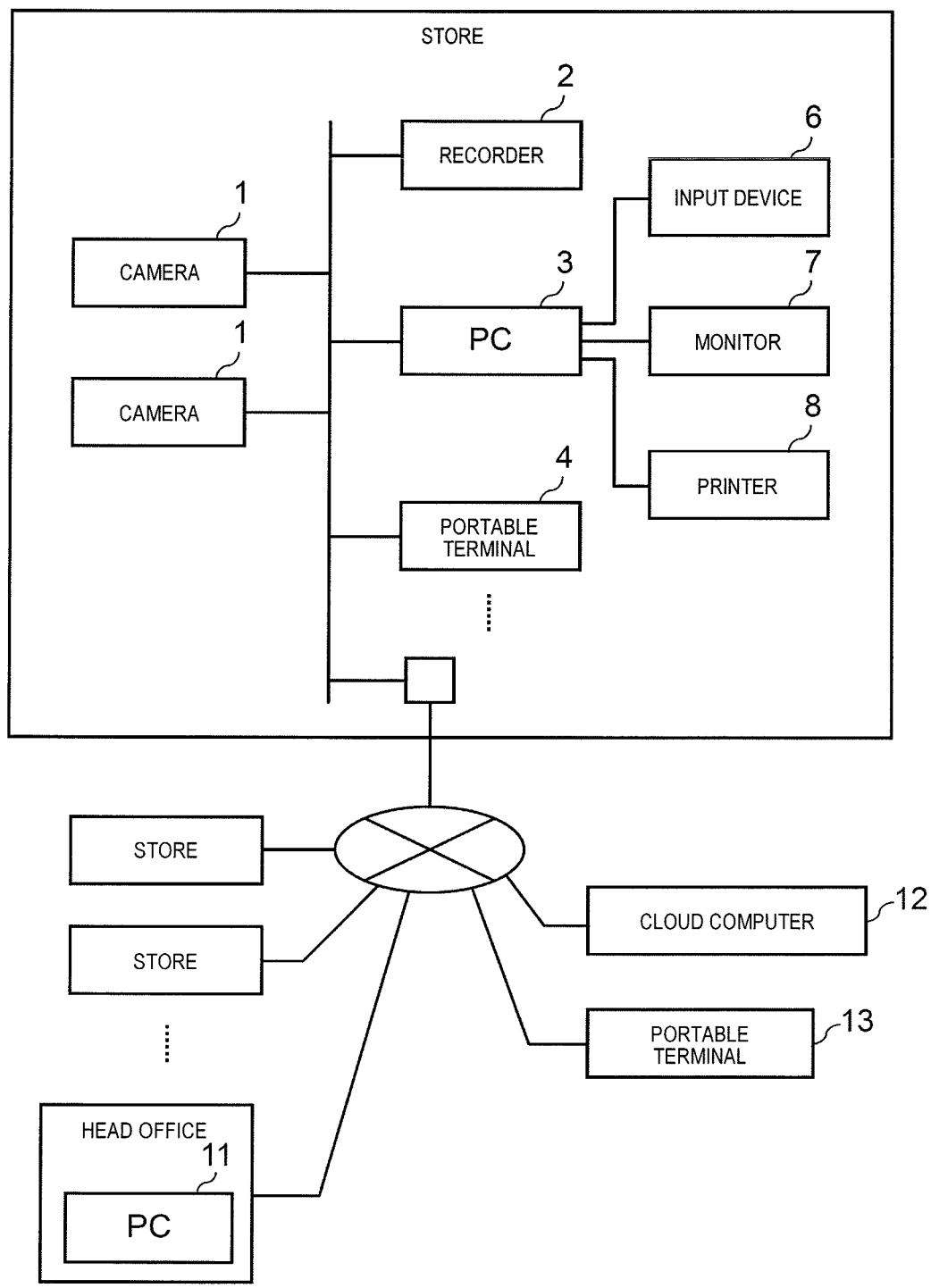
FIG. 1 is an overall configuration diagram of a product monitoring system according to a present exemplary embodiment.

In order to solve the above problems, a first invention is a product monitoring device which monitors a display status of a product, based on a captured image of a display area in a store, and is configured to include an image acquirer that acquires the captured image of the display area, a state monitoring area setter that sets a state monitoring area on the captured image of the display area, a product detector that acquires product detection information indicating a position of a product in the state monitoring area, based on a captured image of the state monitoring area, a display state evaluator that evaluates a display state of the product in the state monitoring area, using a plurality of evaluation indices relating to display disorder of the product, based on the product detection information, and an evaluation information presentation unit that presents information on an evaluation result by the display state evaluator to a user.

According to this, since the evaluation result based on a plurality of evaluation indices regarding the display disorder of products is presented to the user, the user can recognize specific work items of the product management work for improving the inappropriate display state.

Further, a second invention is configured such that the display state evaluator performs evaluation by using at least two of a volume degree indicating a degree to which a large number of products are collectively displayed, an alignment degree indicating a degree to which products are aligned and displayed in a horizontal direction, and a face-up degree indicating a degree to which products are displayed in line with a front most position of the state monitoring area, as the evaluation indices.

According to this, since the evaluation results on the volume degree, the alignment degree, and the face-up degree are presented to the user, the user can recognize which one of the volume degree, the alignment degree, and the face-up degree needs to be increased.

Further, a third invention is configured such that the product detector converts the captured image of the state monitoring area into a top view image, and acquires product detection information, based on the top view image.

According to this, it is possible to properly perform the product detection process, without being influenced by a difference in the appearances of a product in different images depending on the position relationship between the product and the camera.

A fourth invention configured to further include an evaluation result analyzer that generates analysis information representing an attention period, based on an evaluation result by the display state evaluator, and the evaluation information presentation unit presents analysis information to the user.

According to this, the user can immediately recognize an attention period, that is, a period during which it is necessary to call attention to the user regarding the display state of a product.

A fifth invention configured to further include an evaluation result analyzer that performs a statistical process on an evaluation result by the display state evaluator and generates analysis information representing a temporal transition status of the evaluation result, and the evaluation information presentation unit presents analysis information to the user.

According to this, since the analysis information representing a temporal transition status of the evaluation result is presented to the user, the user can clearly recognize a timing at which there is a problem in the product display state and the product management work.

A sixth invention is configured such that the state monitoring area setter sets a state monitoring area for each section obtained by dividing the display area, based on an operation input by the user, and the display state evaluator evaluates the display state of the product for each of a plurality of the state monitoring areas.

According to this, since the user designates the state monitoring area for each section obtained by dividing the display area by the shelf board of the display shelf or the category of a product, according to the necessity of work management, the evaluation result of the product display state for each section can be obtained.

A seventh invention is configured such that the image acquirer acquires a privacy mask image in which an image of a person is deleted from an original captured image of the display area, as the captured image of the display area.

According to this, it is possible to avoid a problem that the product detection information cannot be appropriately acquired due to the image of the person appearing in the captured image of the display area.

An eighth invention is a product monitoring system which monitors a display status of a product, based on a captured image of a display area in a store, and is configured to include a camera that captures an image of the display area, and a plurality of information processing devices, in which one of the plurality of information processing device includes an image acquirer that acquires the captured image of the display area, a state monitoring area setter that sets a state monitoring area on the captured image of the display area, a product detector that acquires product detection information indicating a position of a product in the state monitoring area, based on a captured image of the state monitoring area, a display state evaluator that evaluates a display state of the product in the state monitoring area, using a plurality of evaluation indices relating to display disorder of the product, based on the product detection information, and an evaluation information presentation unit that presents information on an evaluation result by the display state evaluator to a user.

According to this, similar to the first invention, since the evaluation result based on a plurality of evaluation indices regarding the display disorder of products is presented to the user, the user can recognize specific work items of the product management work for improving the inappropriate display state.

A ninth invention is a product monitoring method causing an information processing device to implement a process of monitoring a display status of a product, based on a captured image of a display area in a store, and is configured to include a step of acquiring the captured image of the display area, a step of setting a state monitoring area on the captured image of the display area, a step of acquiring product detection information indicating a position of the product in the state monitoring area, based on a captured image of the state monitoring area, a step of evaluating a display state of the product in the state monitoring area, using a plurality of evaluation indices relating to display disorder of the product, based on the product detection information, and a step of presenting information on an evaluation result generated in the step to a user.

According to this, similar to the first invention, since the evaluation result based on a plurality of evaluation indices regarding the display disorder of products is presented to the user, the user can recognize specific work items of the product management work for improving the inappropriate display state.

Hereinafter, an exemplary embodiment will be described with reference to the drawings.

FIG. 1 is an overall configuration diagram of a product monitoring system according to the present exemplary embodiment. The product monitoring system is constructed for a retail chain store such as a convenience store, and includes camera 1, recorder (image storage device) 2, PC (product monitoring device) 3, and portable terminal 4.

Camera 1 is installed at an appropriate place in the store, and the interior of the store is captured by camera 1, and the captured image of the interior of the store captured by camera 1 is recorded in recorder 2.

Input device 6 such as a mouse by which a user such as a store manager performs various input operations, and monitor (display device) 7 displaying a monitoring screen and printer 8 are connected to PC 3. PC 3 is installed at an appropriate place in the store, and a user can view the captured image of the interior of the store captured by camera 1 in real time on a monitoring screen displayed on monitor 7, and view the past captured image of the interior of the store recorded in recorder 2.

Further, camera 1, recorder 2, and PC 3 are installed in each of a plurality of stores, and PC 11 is installed in the head office which handles the plurality of stores. It is possible to view on PC 11, the captured image of the interior of the store captured by camera 1 in real time and the past captured image (moving picture) of the interior of the store recorded in recorder 2, and thus the situation in the store can be checked at the head office.

PC 3 installed in a store is configured as a product monitoring device that analyzes the display state of products in the store. The analysis information generated by PC 3 can be viewed by the users on the store side, for example, a store manager, in PC 3, and is transmitted to PC 11 installed in the head office. Even in PC 11, users on the head office side, for example, supervisors who provide guidance and suggestions to each store in the area in charge can view the analysis information. PCs 3 and 11 are configured as browsing devices for viewing analysis information.

Portable terminal 4 is possessed by a salesperson or a store manager, and various notifications are provided to the salesperson or the store manager from PC 3 by using portable terminal 4.

Figure 2:
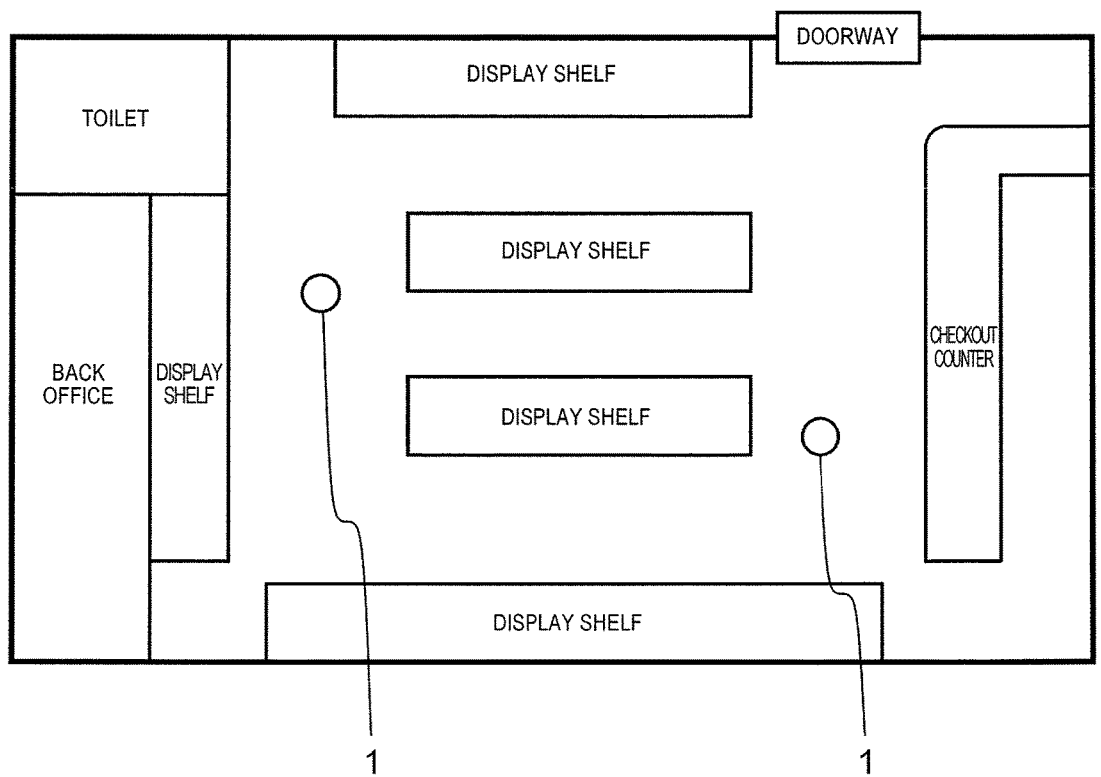
FIG. 2 is a plan view of a store illustrating a layout of a store and an installation status of camera 1.

Next, a layout of a store and an installation situation of cameras 1 will be described. FIG. 2 is a plan view of a store illustrating a layout of the store and an installation status of camera 1.

The store includes a doorway, display shelves, checkout counters, and the like. The display shelves are set up for respective types of products such as fast food, rice (products such as rice balls, lunch boxes, and sushi), processed foods, miscellaneous products, fresh foods, magazines, newspapers, and the like. A customer enters the store through the doorway, and moves in the store through passages between the display shelves. When finding a desired product, the customer goes to the checkout counter with the product, makes payment (pays for the product) at the checkout counter, and exits the store through the doorway.

In addition, plural cameras 1 which capture images of the interior of the store (monitoring areas) are installed in the store. Cameras 1 are installed at appropriate positions on the ceiling in the store. In particular, in the example illustrated in FIG. 2, an omnidirectional camera having a photographing range of 360 degrees using a fisheye lens is used as camera 1, and the products displayed on the display shelves or the like can be captured by camera 1.

Figure 3:
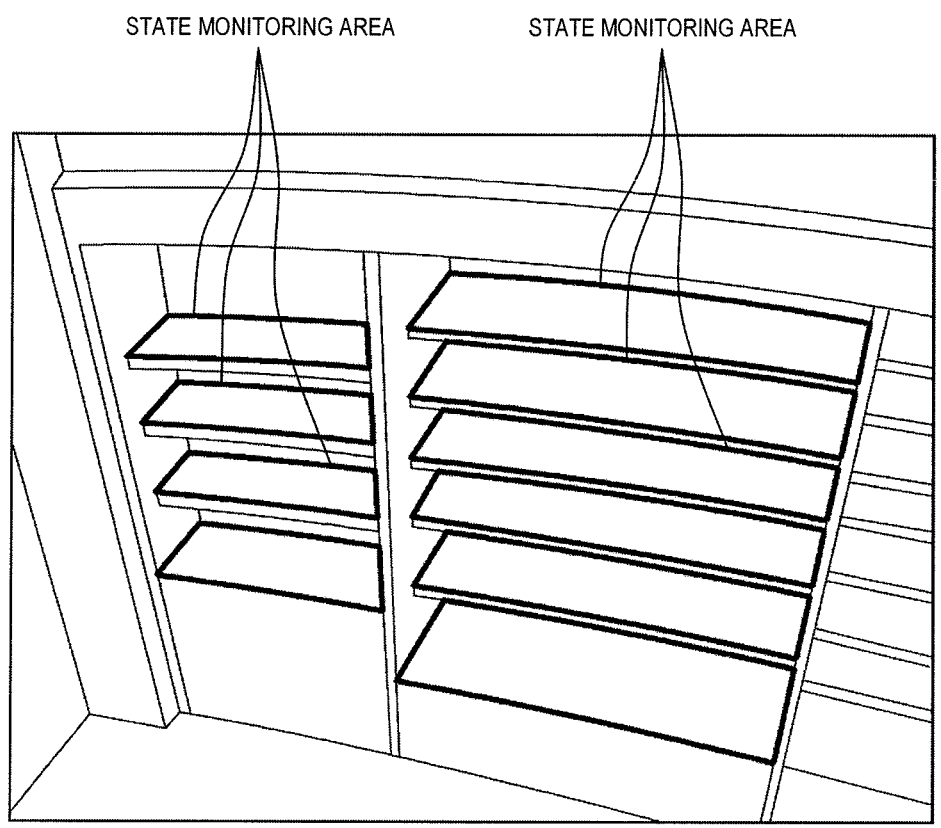
FIG. 3 is an explanatory diagram illustrating a state monitoring area which is set on a captured image of a display area.

Next, an area setting process performed by PC 3 illustrated in FIG. 1 will be described. FIG. 3 is an explanatory diagram illustrating a state monitoring area which is set on a captured image of a display area.

On PC 3, a state monitoring area is set on the captured image of the display area (such as a display shelf and a display stand), based on the operation input by the user. The state monitoring area can be set for each section obtained by dividing the display area by the shelf board of the display shelf or the category of the product. Specifically, the state monitoring area is set so as to surround the region where the product in the image of the display area is placed.

In the example shown in FIG. 3, a display shelf for displaying products such as cooked rice (products such as rice balls, lunch boxes, and sushi) is set as a target display area, and a plurality of state monitoring areas are set in each shelf board of the display shelf. The state monitoring area may be set to a quadrangle shape by designating four vertices, but the boundary line of the state monitoring area may be designated by a curve.

Figure 4:
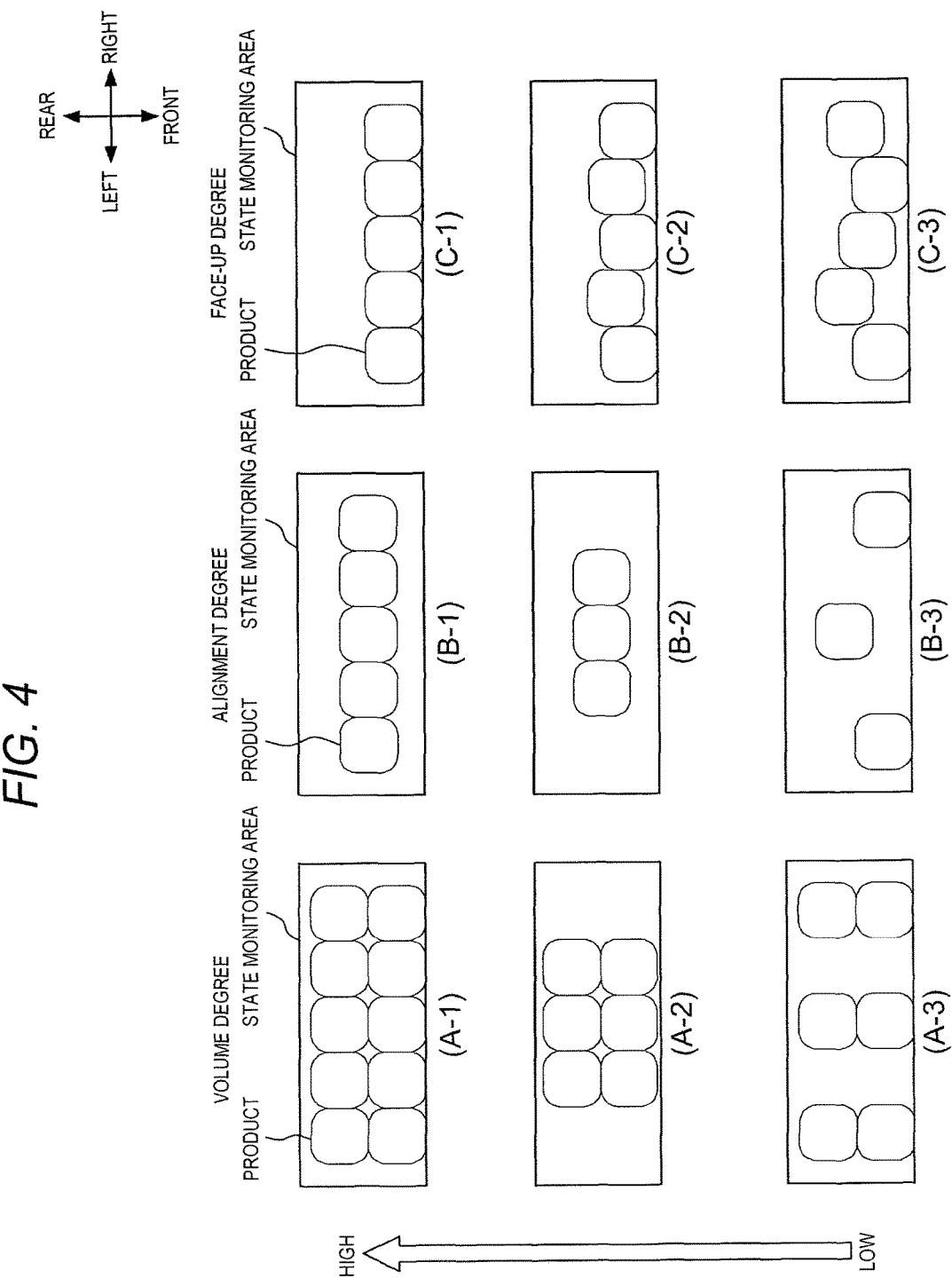
FIG. 4 is an explanatory diagram for explaining a volume degree, an alignment degree, and a face-up degree as evaluation indices of a display state.

Next, the display state evaluation performed by PC 3 illustrated in FIG. 1 will be described. FIG. 4 is an explanatory diagram for explaining a volume degree, an alignment degree, and a face-up degree as evaluation indices of the display state.

In stores such as convenience stores, if the display state of the products displayed in the display area (such as a display shelf or a display stand) is not appropriate, especially, the display of products is disorder, the customer's purchase motivation is reduced, and loss occurs at an opportunity, which may have a significant impact on product sales.

Thus, in the present exemplary embodiment, the display state of the product is evaluated using the evaluation index on the display disorder of product in PC 3. In the evaluation of the display state, a plurality of evaluation indices are used, and in the present exemplary embodiment, as shown in FIG. 4, the volume degree, the alignment degree, and the face-up degree are used as the evaluation indices.

The volume degree is an evaluation index indicating a degree to which a large number of products are collectively displayed, and as the volume degree is increased, it becomes a state where customers do not feel that the products are left over, and the customer's purchase motivation can be enhanced.
As shown in FIG. 4(A-1), if products are displayed full in the state monitoring area, the volume degree is highest. As shown in FIG. 4(A-2), even if the quantity of products is small, if products are collectively displayed, the volume degree is relatively high. As shown in FIG. 4(A-3), if there is a large gap between products, the volume degree is low.

The alignment degree is an evaluation index indicating a degree to which products are aligned and displayed in a horizontal direction (lateral direction), and as the alignment degree is increased, the products look better and the customer's purchase motivation can be enhanced. As shown in FIG. 4(B-1), if a large number of products are lined up straight in the horizontal direction, the alignment degree is highest. As shown in FIG. 4(B-2), even if the quantity of products is small, if the products are arranged to be aligned in the horizontal direction, the alignment degree is relatively high. As shown in FIG. 4(B-3), if products are arranged to vary in the longitudinal direction and there is a gap between products, the alignment degree is low.

The face-up degree is an evaluation index indicating a degree to which products are displayed in line with a front most position of the state monitoring area, and as the face-up degree is increased, the products look better, it is easy for the customers to evaluate the products, and the customer's purchase motivation can be enhanced. As shown in FIG. 4(C-1), if all of the displayed products are placed in the forefront position, the face-up degree is highest. As shown in FIG. 4(C-2) and FIG. 4(C-3), as the number of products shifted from the front most position to the back side increases, the face-up degree is low.

In stores such as convenience stores, if there is a shortage of products in the display area, loss occurs at an opportunity, which has a significant impact on sales in the store. Therefore, in the present exemplary embodiment, the evaluation on the display shortage state of a product is performed, using an occupancy representing the degree to which the product occupies in the state monitoring area, as an evaluation index on the shortage of a product in display, in addition to the evaluation index on the disorder of the display of the product.

Figure 5:
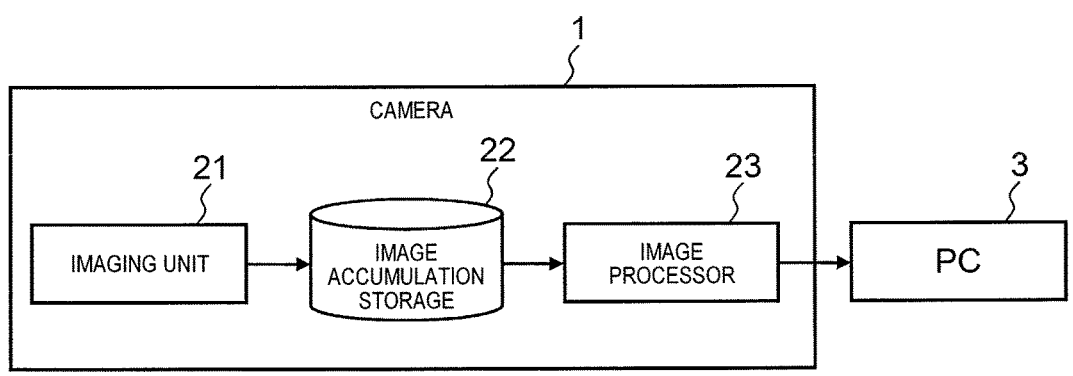
FIG. 5 is a functional block diagram illustrating a schematic configuration of camera 1.

Next, a schematic configuration of camera 1 shown in FIG. 1 will be described. FIG. 5 is a functional block diagram illustrating a schematic configuration of camera 1.

Camera 1 is used to output a privacy mask image obtained by deleting a person from the captured image of the interior of the store, and includes an imaging unit 21, an image storage 22, and an image processor 23.

Imaging unit 21 includes an imaging device and its control circuit, and outputs an image obtained by capturing an image of the monitoring area. The image (frame) which is output from imaging unit 21 is accumulated in image storage 22.

Image processing unit 23 performs a process for generating a privacy mask image which is obtained by removing the image region (foreground image) of a moving object (person) from the captured image. In this process, a privacy mask image is generated from a plurality of images (frames) in the latest predetermined learning period and if a new image (frame) is acquired, the privacy mask image is sequentially updated. A known technique for generating the background image may be used for the process performed by image processor 23.

By activating the web browser on PC 3 and accessing camera 1 through the network, it is possible to select the setting item of camera 1. Specifically, in a case where the omnidirectional camera is adopted as camera 1, there is an item of "moving object removal mode" as setting of a privacy mask process of a captured image, and it is possible to select the format of the captured image (JPEG, H.264, OFF) to be subjected to moving object removal. There is an item of "image type", and it is possible to select the type of an image (such as a fisheye image, a four-PTZ image, a one-PTZ image, a double panorama image, and a single panorama image) to be subjected to moving object removal. Further, in the item of "foreground superimposition", it is possible to select whether or not foreground superimposition (a process of superimposing the mask image of a person on the background image) is performed. Here, when foreground superimposition is turned off, a person-erased image is output.

Figure 6:
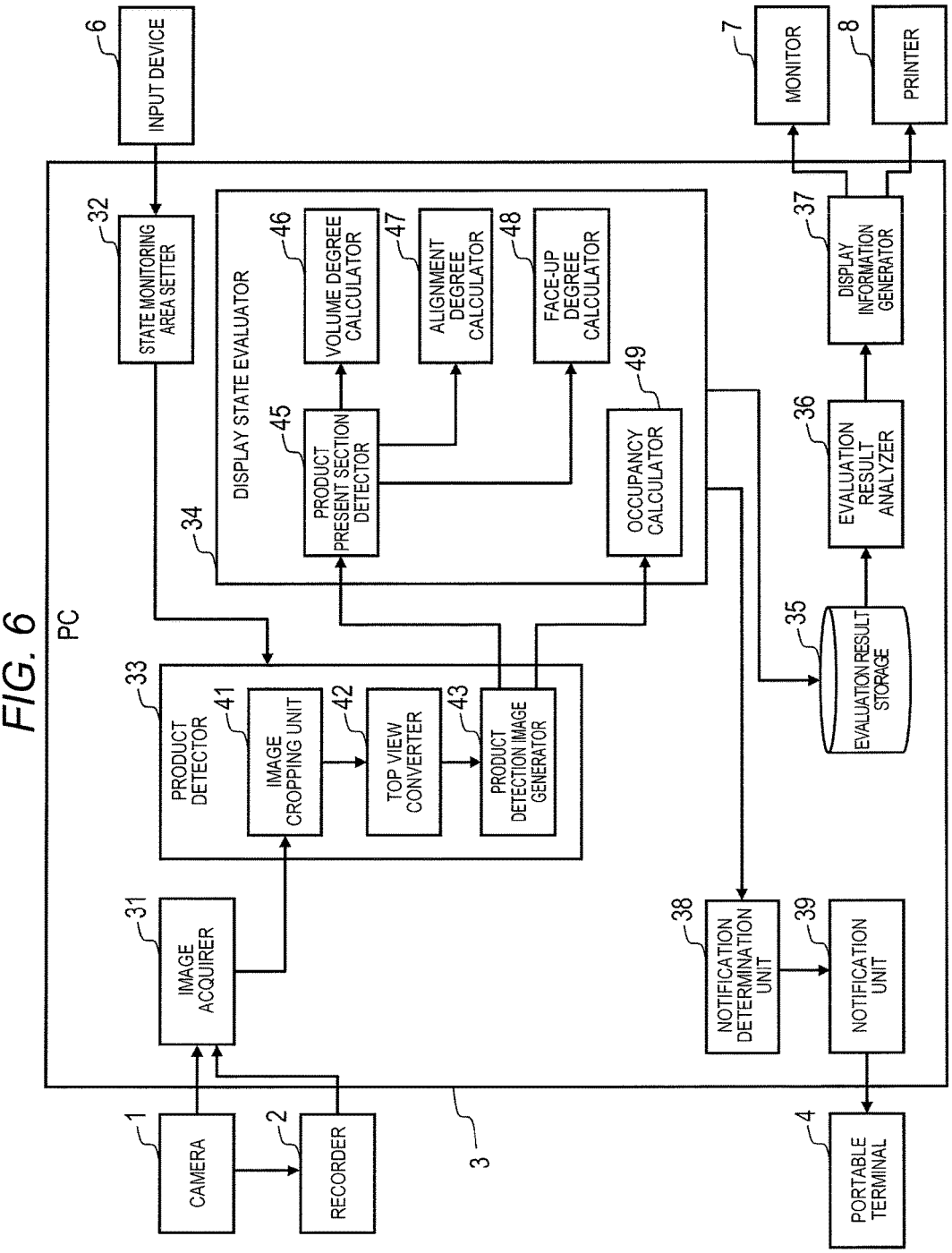
FIG. 6 is a functional block diagram illustrating a schematic configuration of PC 3.

Next, a schematic configuration of PC 3 shown in FIG. 1 will be described. FIG. 6 is a functional block diagram illustrating a schematic configuration of PC 3.

PC 3 includes image acquirer 31, state monitoring area setter 32, product detector 33, display state evaluator 34, evaluation result storage 35, evaluation result analyzer 36, display information generator (evaluation information presentator) 37, notification determination unit 38, and notification unit 39.

Image acquisition unit 31 acquires the captured image of the interior of the store captured by camera 1 from camera 1 or recorder 2. Here, in a case of processing the current captured image in real time, a captured image is acquired from camera 1. In a case of processing the past captured image, a captured image is acquired from recorder 2. In the present exemplary embodiment, as described above, the privacy mask image is output from camera 1, and image acquirer 31 acquires the privacy mask image.

State monitoring area setting unit 32 performs a process for setting the state monitoring area (see FIG. 3) on the captured image of a display area in response to the user's input operation performed using input device 6. At this time, an area setting screen displaying the captured image of a display area may be displayed on monitor 7, and the position of the state monitoring area may be input on the area setting screen.

Product detection unit 33 acquires product detection information indicating a position of a product in the state monitoring area, based on a captured image of the state monitoring area. In the present exemplary embodiment, a product detection image representing a product region and other regions by a binary image is generated as product detection information. Product detection unit 33 includes image cropping unit 41, top view converter 42, and product detection image generator 43.

Image cropping unit 41 extracts the image region of the state monitoring area from the captured image of a display area obtained by image acquirer 31, and acquires the captured image of the state monitoring area. Top view converter 42 converts the captured image of the state monitoring area into a top view image. Product detection image generation unit 43 binarizes top view image to generate a product detection image.

Display state evaluation unit 34 evaluates the display state of the product in the state monitoring area, based on the product detection image generated by product detector 33, by using a plurality of evaluation indices. Display state evaluation unit 34 includes product present section detector 45, volume degree calculator 46, alignment degree calculator 47, face-up degree calculator 48, and occupancy calculator 49.

Product present section detection unit 45 detects a section in the horizontal direction in which the product is present, based on the product detection image generated by product detector 33.

Volume degree calculator 46, alignment degree calculator 47, and face-up degree calculator 48 respectively calculate a volume degree indicating a degree to which a large number of products are collectively displayed, an alignment degree indicating a degree to which products are aligned and displayed in a horizontal direction, and a face-up degree indicating a degree to which products are displayed in line with a front most position of the state monitoring area, as evaluation indices regarding the display disorder of a product, based on the product detection image generated by product detector 33 and the product present section detected by product present section detector 45.

Display state evaluation unit 34 compares the volume degree, the alignment degree, and the face-up degree (the evaluation result for each evaluation index) which are respectively calculated by volume degree calculator 46, alignment degree calculator 47, and face-up degree calculator 48 with a predetermined threshold value, and makes a determination about three states of an appropriate state, a mild disorder state, and a severe disorder state for each evaluation index, for example.

Occupancy calculator 49 calculates the occupancy (occupancy rate) representing the degree (proportion) to which the product occupies in the state monitoring area, as the evaluation index on the shortage of a product in display. Display state evaluation unit 34 compares the occupancy calculated by occupancy calculator 49 with a predetermined threshold value, and determines three states of for example, a satisfaction state, a mild shortage state, and a severe shortage state.

The volume degree, the alignment degree, the face-up degree, and the occupancy which are respectively calculated by volume degree calculator 46, alignment degree calculator 47, face-up degree calculator 48, and occupancy calculator 49 are accumulated in evaluation result storage 35, as an evaluation result of the display state, together with the state determination result.

The evaluation result analyzer 36 generates analysis information by analyzing the evaluation result of the display state accumulated in evaluation result storage 35. In the present exemplary embodiment, analysis information indicating the attention period during which it is necessary to call attention to the user regarding the display state of a product, based on the evaluation result by display state evaluator 34. Analysis information indicating the temporal transition status of the evaluation result of the product display state is generated by performing a statistical process on the evaluation result by display state evaluator 34.

The analysis information can be generated for each evaluation index (such as a volume degree), and can be generated for each category (type) of a product. In the statistical process, the evaluation result by display state evaluator 34 is aggregated in the aggregation unit period and the evaluation result for each aggregation unit period is acquired. The aggregation unit period can be appropriately set to, for example, 1 hour, 1 day, 1 week, 1 month, or the like, according to the needs of the user.

In addition thereto, evaluation result analyzer 36 may generate analysis information obtained by aggregating the elapsed time from when an inappropriate display state occurs until the inappropriate display state is resolved. In addition, the evaluation result by display state evaluator 34 may be aggregated for each store to acquire the evaluation result for each store. The evaluation result is managed in a point of sale (POS) system.

The sales information (the name, quantity, amount of money, and accounting time of the product purchased by the customer) may be acquired, and analysis may be performed by combining the sales information. Customer information such as the number of people staying in or the number of people entering each display area may be acquired by performing a person detection process on the image captured by camera 1, and analysis may be performed by combining the customer information.

Display information generation unit 37 generates display information on the analysis information generated by evaluation result analyzer 36, and outputs it to monitor 7 or printer 8. In the present exemplary embodiment, display information for displaying a screen displaying the analysis information, on monitor 7 is generated. Display information for outputting a form representing the analysis information to printer 8 is generated.

Notification determination unit 38 performs a process of determining the availability and content of notification (alert) instructing a salesperson to perform the product management work, based on the evaluation result of the display state by display state evaluator 34. In this process, the necessity of notification is determined based on the evaluation result of the display state, and in a case where it is determined that notification is necessary, a work item of the product management work necessary for resolving the inappropriate display state is determined. In particular, in the present exemplary embodiment, in a case where the inappropriate display state is left for a long time, it is determined to make a notification. Specifically, in a case where the duration of the inappropriate display state exceeds a predetermined threshold value, it is determined to make a notification.

Information on the congestion status in the store and the checkout counter is acquired by performing the person detection process on the image captured by camera 1, based on the information and the evaluation result from display state evaluator 34, the presence or absence of a necessary executable work may be determined, and the availability and content of notification may be determined.

Based on the determination result of notification determination unit 38, notification unit 39 makes a notification informing the store manager that the display state is inappropriate, or a notification instructing a salesperson to perform a required product management work according to the inappropriate display state. In this notification, a message may be displayed on a screen of portable terminal (a tablet terminal or a smartphone) 4 carried by the salesperson or the store manager, but a message may be displayed on a screen of a POS terminal installed in the checkout counter. A display panel installed near the ceiling of the store, or a suitable output device such as a lamp or a speaker may be used. A notification informing the supervisor at the head office that the display state is inappropriate may be made.

In addition, each unit of PC 3 shown in FIG. 6 is realized by causing a processor (CPU) of PC 3 to execute a product monitoring program (instruction) stored in a memory such as an HDD. These programs may be installed in PC 3 which is an information processing device in advance and configured as a dedicated device, or may be provided to the user by being recorded in an appropriate program recording medium or through a network, as an application program operating on a predetermined OS.

Various threshold values used in each unit of PC 3 can be arbitrarily set by the user, and a process of setting a threshold value according to a user's input operation is performed in PC 3.

Figure 7A:
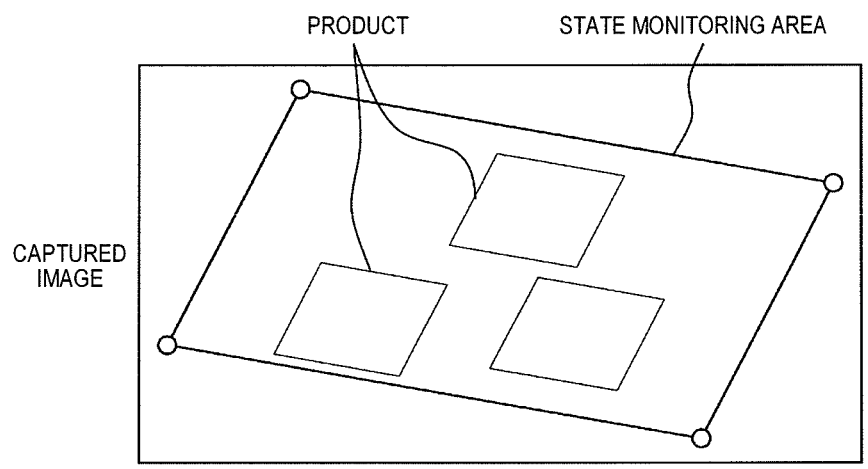
FIG. 7A is an explanatory diagram for explaining the outline of a product detection process performed by product detector 33.
Figure 7B:
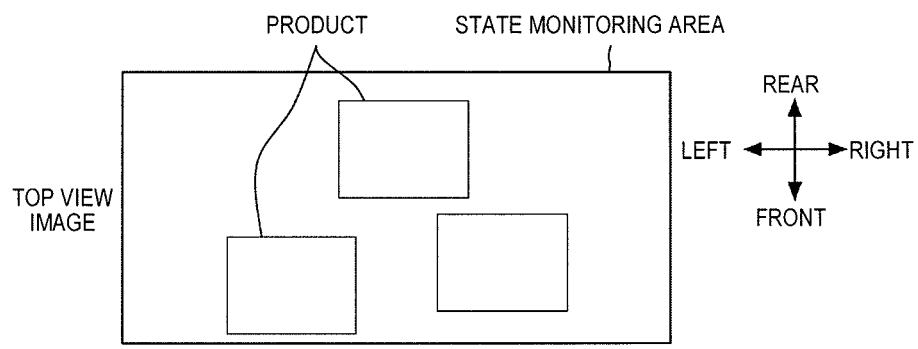
FIG. 7B is an explanatory diagram for explaining the outline of a product detection process performed by product detector 33.
Figure 7C:
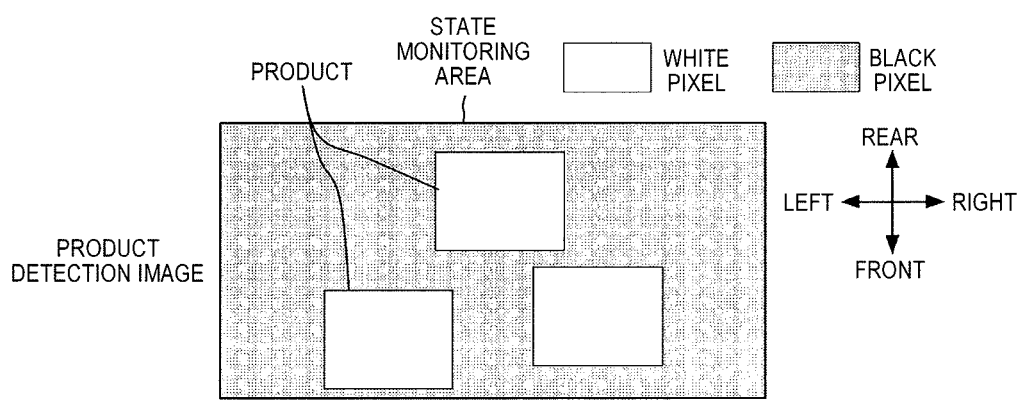
FIG. 7C is an explanatory diagram for explaining the outline of a product detection process performed by product detector 33.

Next, the product detection process executed by product detector 33 illustrated in FIG. 1 will be described. FIGS. 7A to 7C are explanatory diagrams for explaining the outline of the product detection process performed by product detector 33.

In the present exemplary embodiment, as shown in FIG. 7A, a state monitoring area is set on the image captured by camera 1, and first, image cropping unit 41 of product detector 33 performs a process for cropping the image region of the state monitoring area from the captured image.

Next, as shown in FIG. 7B, top view converter 42 performs a process of converting the captured image of the state monitoring area into a top view image. The top view image is a view of the state monitoring area from the viewpoint directly above or obliquely above from the front, in which the vertical direction and the horizontal direction of the image are made to coincide with the actual longitudinal direction and the horizontal direction of the display shelf respectively, and the lower end of the image is the position of the front surface of the display shelf.

Here, when camera 1 captures a display shelf, it is actually difficult to capture all the shelf boards of the display shelf directly in front of it, and the way in which the products are displayed on each shelf board in the captured image of the display boards of the display shelf (captured image of a display area) varies depending on the position relationship between the shelf board of the display shelf and camera 1. Therefore, as a normalization for enabling subsequent processes to be performed in the same procedure, a process of converting the captured image of the state monitoring area into a top view image is performed.

Next, as shown in FIG. 7C, product detection image generator 43 binarizes the top view image to generate a product detection image. In the product detection image, image regions of the product are white pixels, and image regions other than the product are black pixels. Noise is removed by the binarization process, and in the product detection image, the region where a product is present can be clearly and accurately identified.

Figure 8:
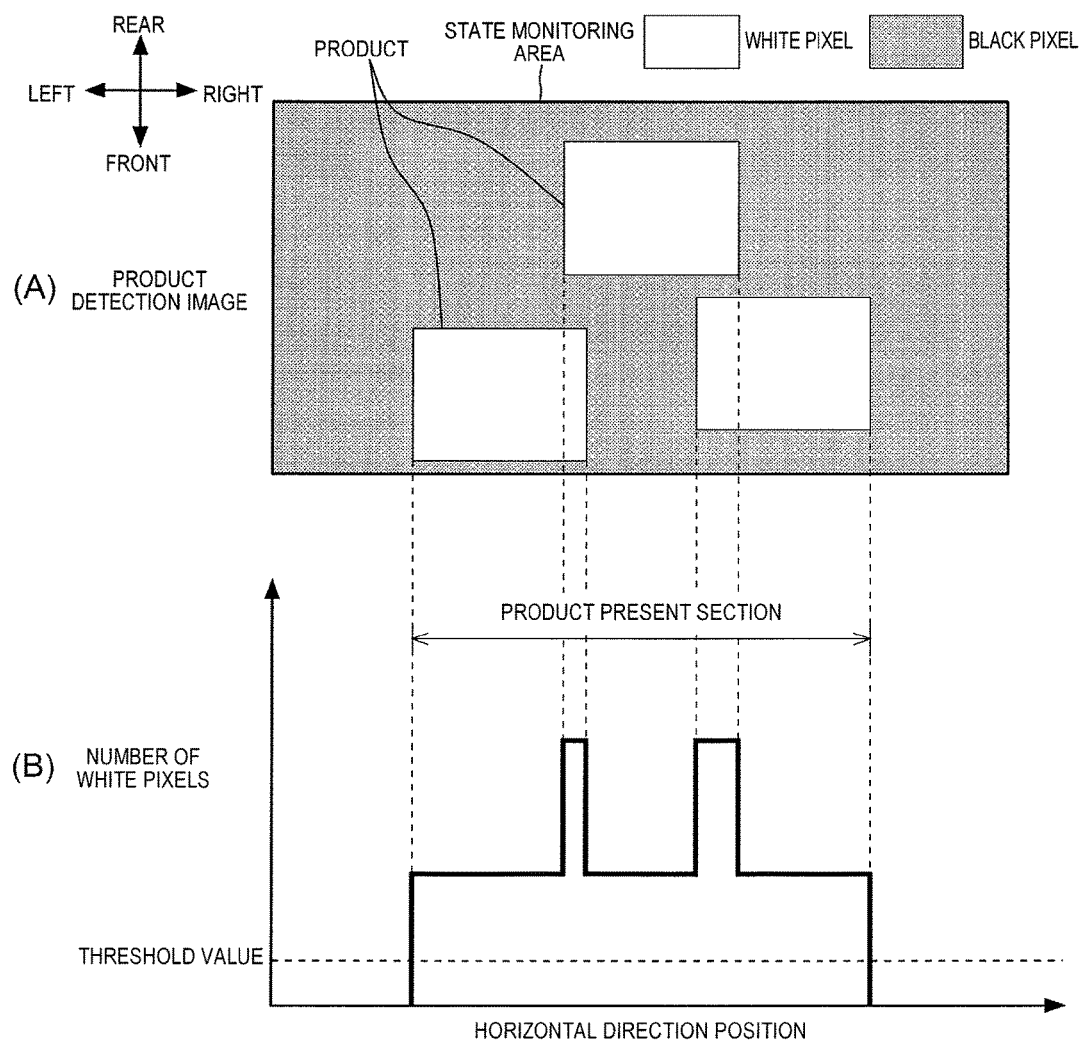
FIG. 8 is an explanatory diagram for explaining the outline of a product present section detection process performed by product present section detector 45.

Next, the product present section detection process executed by product present section detector 45 illustrated in FIG. 6 will be described. FIG. 8 is an explanatory diagram for explaining the outline of a product present section detection process performed by product present section detector 45.

Product present section detection unit 45 detects a section in the horizontal direction in which the product is present, based on the product detection image, shown in FIG. 8(A), generated by product detector 33. In the present exemplary embodiment, white pixels are counted in the longitudinal direction in the product detection image and the number of white pixels at each position in the horizontal direction is obtained, as shown in FIG. 8(B). The number of white pixels at each position in the horizontal direction is compared with a predetermined threshold value, and a section where the number of white pixels is larger than the threshold value is detected as a product present section. The width (the number of pixels) B of the product present section is obtained.

The product present section detected by product present section detector 45 is the target range of the processes to be performed by volume degree calculator 46, alignment degree calculator 47, and face-up degree calculator 48. In the example shown in FIG. 8, since the three products overlap each other at the position in the horizontal direction position, one product present section is detected, but in a case where a plurality of products do not overlap in the horizontal direction position, that is, there is a gap in the horizontal direction between a plurality of products, a plurality of product present sections are detected.

Figure 9:
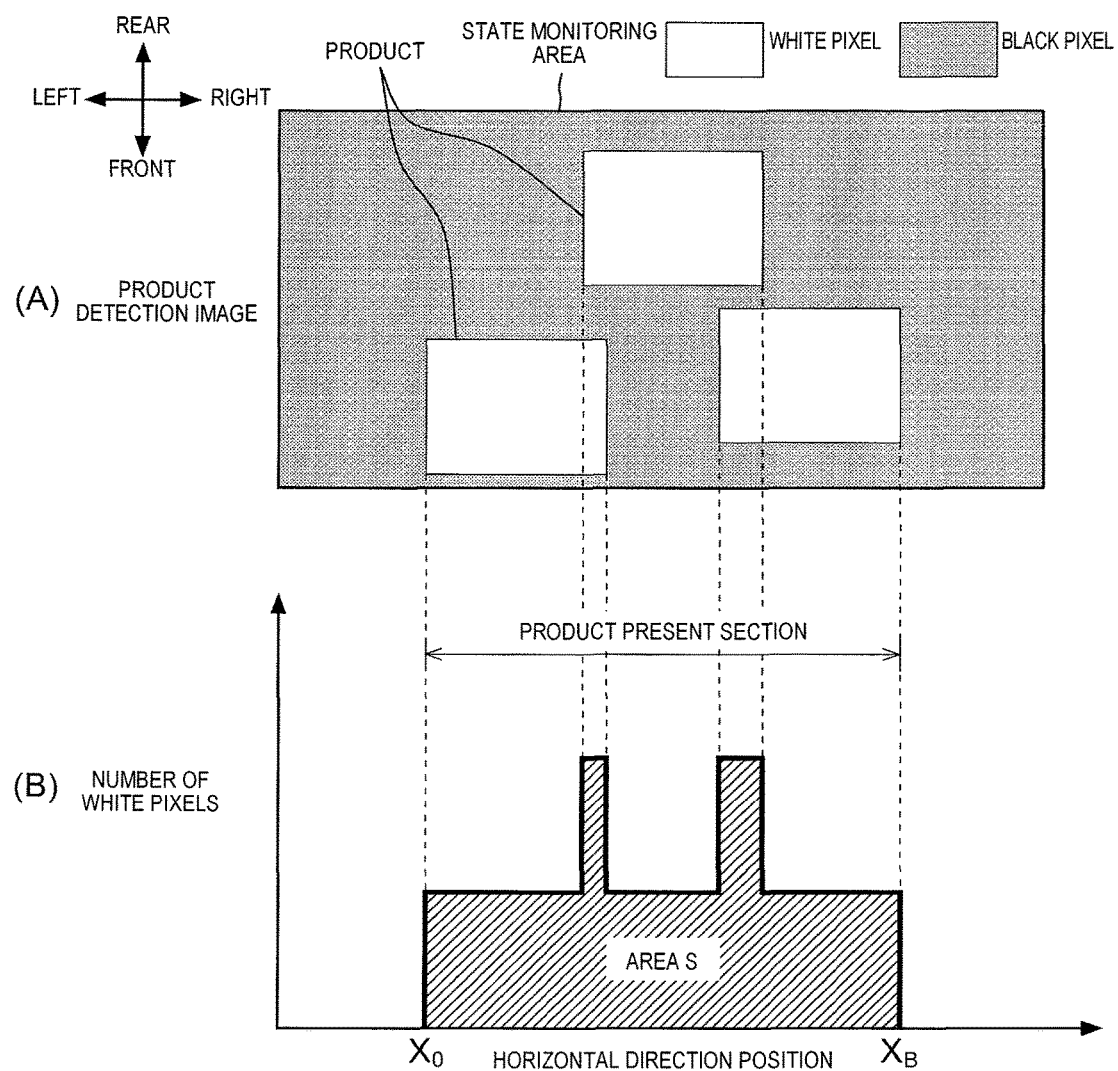
FIG. 9 is an explanatory diagram for explaining the outline of a volume degree calculation process performed by volume degree calculator 46.

Next, the volume degree calculation process executed by volume degree calculator 46 illustrated in FIG. 6 will be described. FIG. 9 is an explanatory diagram for explaining the outline of a volume degree calculation process performed by volume degree calculator 46.

The volume degree calculator 46 calculates a volume degree indicating a degree to which a large number of products are collectively displayed, based on the product detection image generated by the product detector 33, and the product present section detected by the product present section detector 45. Specifically, as shown in FIG. 9(B), first, the area S of a region defined by the number of white pixels at each position ($x_0$ to $x_B$) in the horizontal direction in the product present section is obtained.

A variance v of the white pixels present in the product present section at a horizontal direction position (a distance from the left end) x is obtained. The variance v is calculated by the following equation.

$$v = \sum_{i=0}^{B}(x_i - \bar{x})/(B-1) \quad \text{(Equation 1)}$$

$\bar{x}$: average value of the number of white pixels in the horizontal direction A volume degree V is calculated from the area S and the variance v by the following equation.

$$V = S/v \quad \text{(Equation 2)}$$

The volume degree V is calculated in this way. In a state where variance v is small, that is, products are gathered in the horizontal direction, the volume degree is high. In a state where variance v is large, that is, products are dispersed in the horizontal direction, the volume degree is low. If the area S is small, that is, there are a small number of products, the volume degree is low. If the area S is large, that is, there are many products, the volume degree is high.

Figure 10:
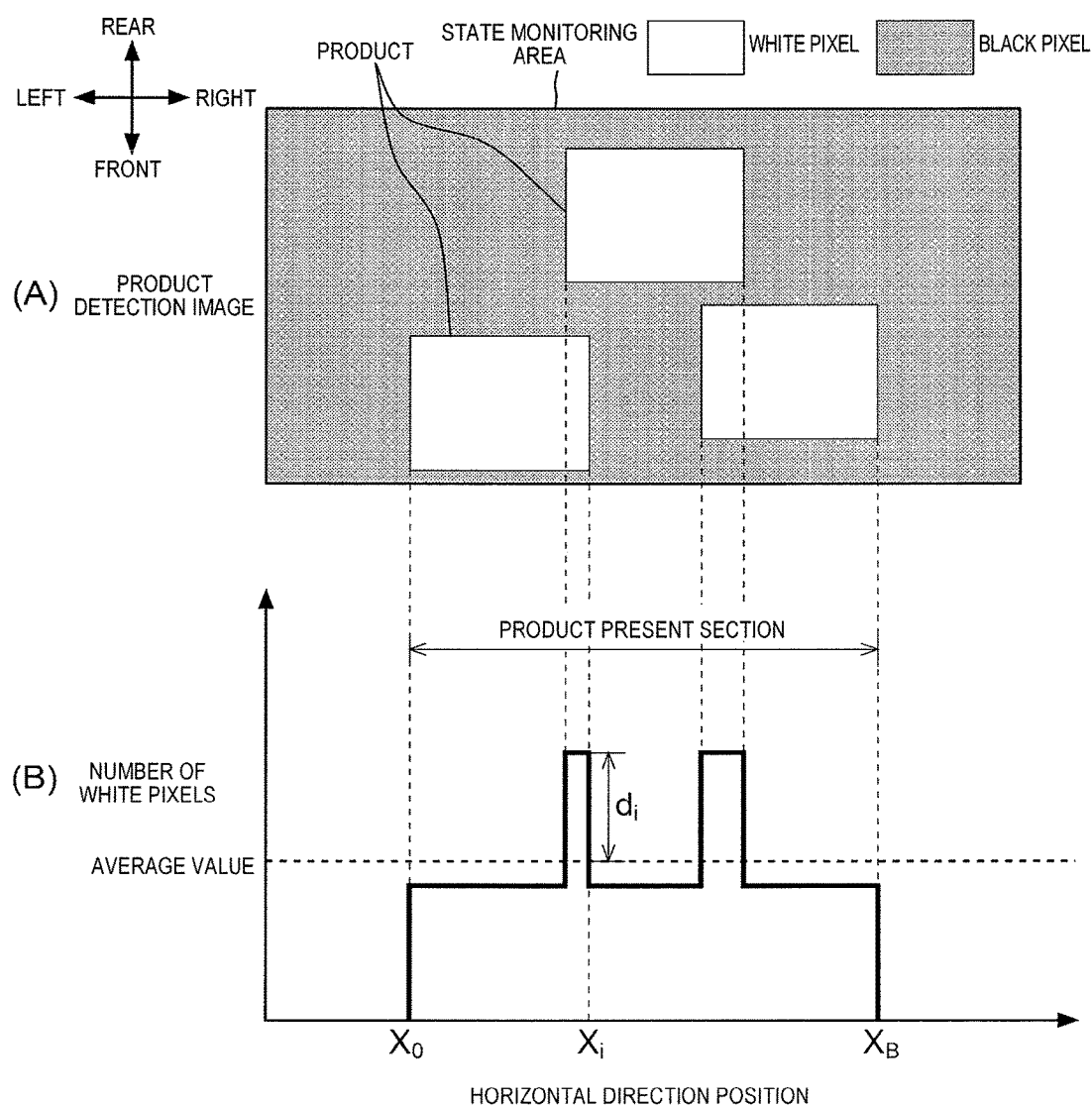
FIG. 10 is an explanatory diagram for explaining the outline of an alignment degree calculation process performed by alignment degree calculator 47.

Next, the alignment degree calculation process executed by alignment degree calculator 47 illustrated in FIG. 6 will be described. FIG. 10 is an explanatory diagram for explaining the outline of an alignment degree calculation process performed by alignment degree calculator 47.

The alignment degree calculator 47 calculates an alignment degree indicating a degree to which products are aligned and displayed in a horizontal direction, based on the product detection image generated by the product detector 33, and the product present section detected by the product present section detector 45. Specifically, as shown in FIG. 10(B), first, the average value of the number of white pixels at each position ($x_0$ to $x_B$) in the horizontal direction in the product present section is obtained. Next, a difference d between the number of white pixels at each position in the horizontal direction and the average value is obtained. Then, the sum of the absolute values of the differences d at respective positions in the horizontal direction is calculated, and the reciprocal of the value obtained by dividing the sum by the width B of the product present section is defined as alignment degree L. The alignment degree L is calculated by the following equation.

$$L = \frac{1}{\left(\sum_{i=0}^{B} |d_i|/B\right)} \quad \text{(Equation 3)}$$

When the alignment degree L is calculated in this way and the positions of the products in the longitudinal direction vary, the sum of the absolute values of the differences d increases, so that the alignment degree L decreases. As the width B of the product present section increases, the alignment degree L increases.

Figure 11:
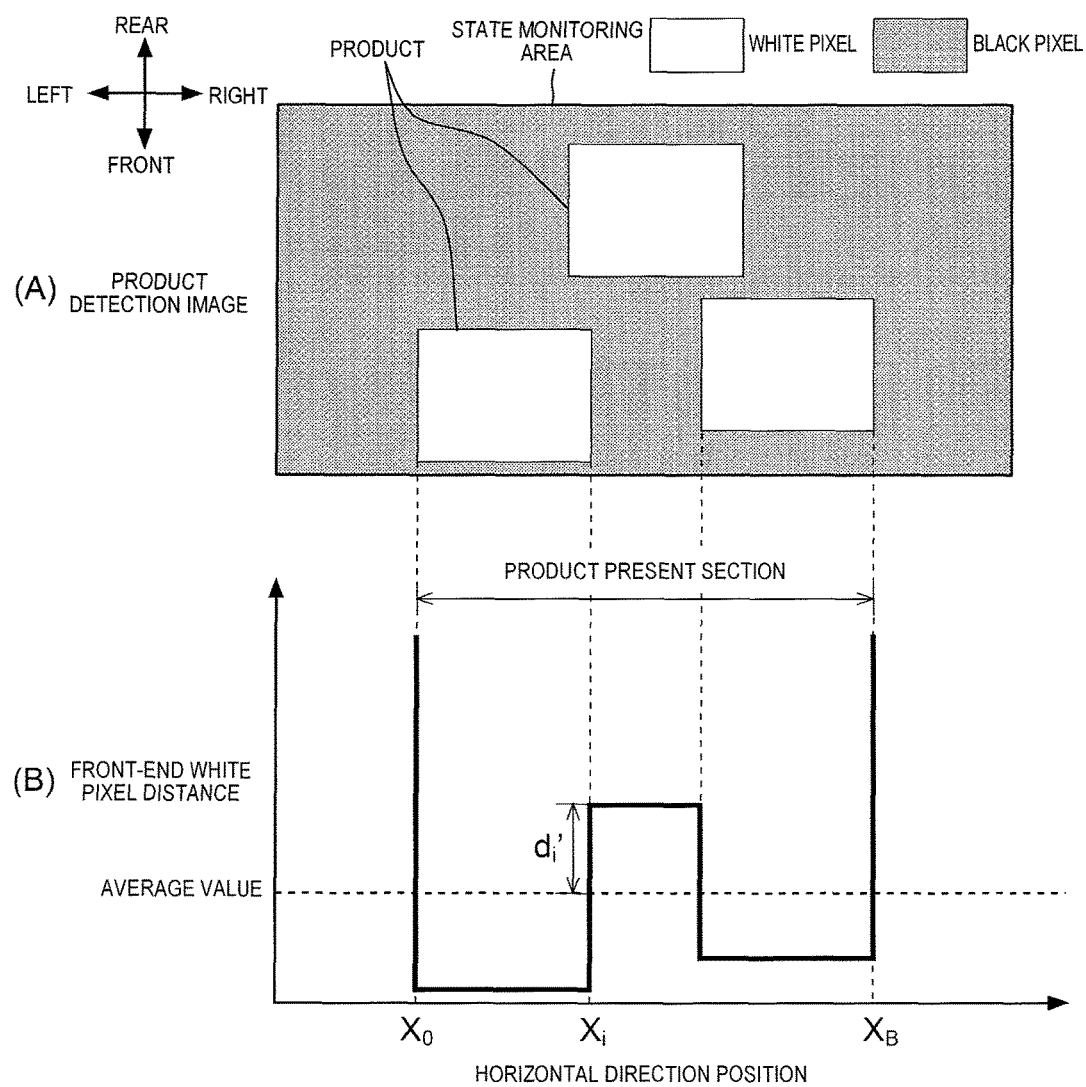
FIG. 11 is an explanatory diagram for explaining the outline of an alignment degree calculation process performed by alignment degree calculator 47.

Next, the alignment degree calculation process in consideration with the face-up calculated by alignment degree calculator 47 illustrated in FIG. 6 will be described. FIG. 11 is an explanatory diagram for explaining the outline of the alignment degree calculation process performed by alignment degree calculator 47 in consideration of face-up.

As shown in FIG. 10, alignment degree calculator 47 calculates a simple alignment degree as an index indicating a degree to which products are aligned and displayed in a horizontal direction, and in addition to this, it is possible to calculate an alignment degree in consideration with face-up.

In the calculation of the simple alignment degree shown in FIG. 10, the alignment degree is calculated based on the difference based on the average value of the number of white pixels at each position ($x_0$ to $x_B$) in the horizontal direction in the product present section, but in the calculation of the alignment degree in consideration of the face-up shown in FIG. 11, the front-end white pixel distance at each position ($x_0$ to $x_B$) in the horizontal direction in the product present section, that is, a distance from the front end of the state monitoring area to the white pixel located on the front most side is obtained, and the alignment degree is calculated based on the difference based on the average value of the front-end white pixel distance.

That is, the average value of the front-end white pixel distance at each of positions ($x_0$ to $x_B$) in the horizontal direction in the product present section is obtained, and difference d between the average value of the front-end white pixel distance and the number of white pixels at each position in the horizontal direction is obtained. Then, the sum of the absolute value of the difference d' at each position in the horizontal direction is calculated, and the reciprocal of the value obtained by dividing the sum by the width B of the product present section is defined as alignment degree L'. The alignment degree L' is calculated by the following equation.

$$L' = \frac{1}{\left(\sum_{i=0}^{B} |d'_i|/B\right)} \quad \text{(Equation 4)}$$

When the alignment degree L' is calculated in this way and the positions of the front ends of the products in the longitudinal direction vary, the sum of the absolute values of the differences d' increases, so that the alignment degree L' decreases.

Figure 12:
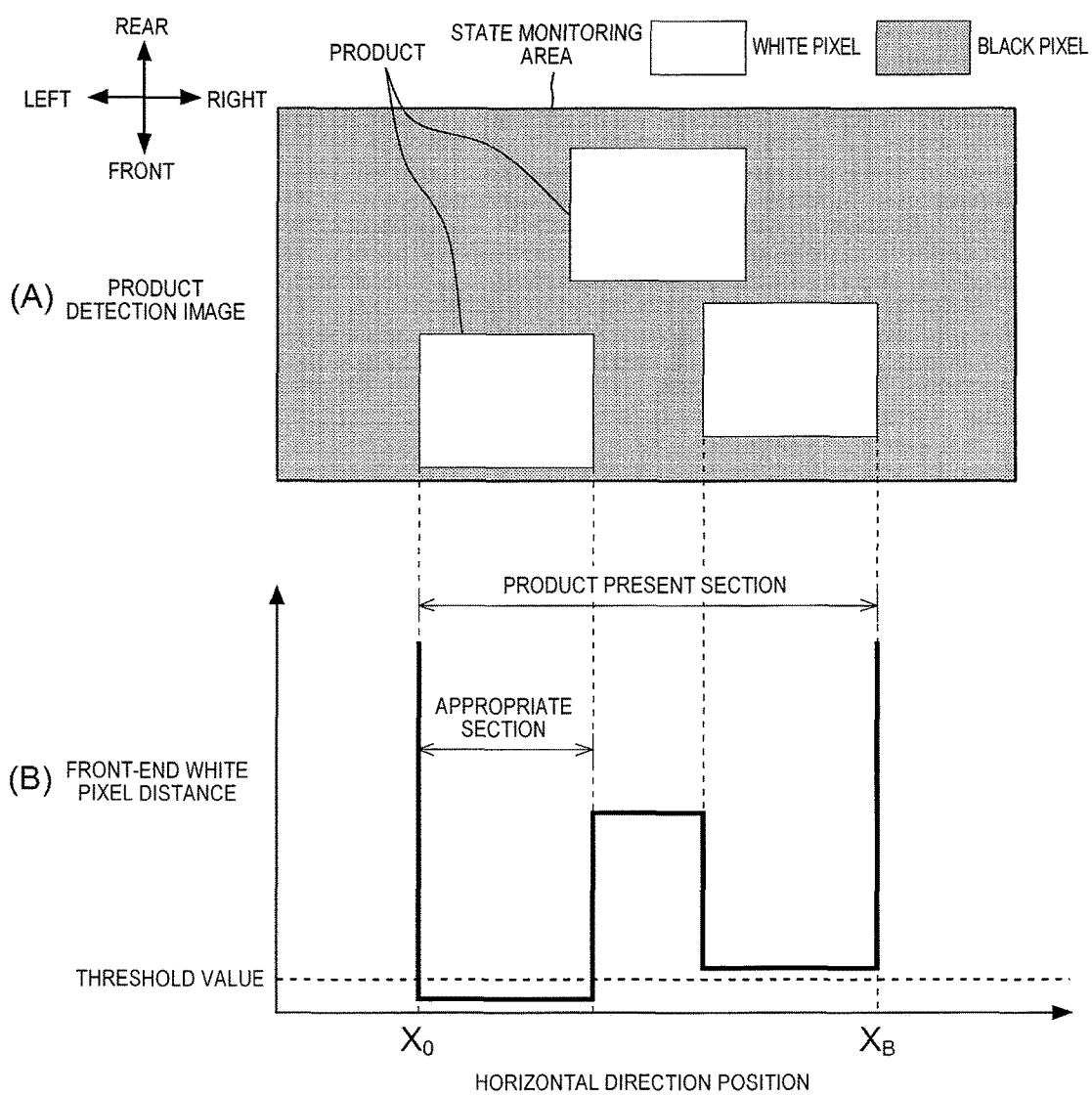
FIG. 12 is an explanatory diagram for explaining the outline of a face-up degree calculation process performed by face-up degree calculator 48.

Next, the face-up degree calculation process performed by face-up degree calculator 48 illustrated in FIG. 6 will be described. FIG. 12 is an explanatory diagram for explaining the outline of the face-up degree calculation process performed by face-up degree calculator 48.

Face-up degree calculator 48 calculates a face-up degree indicating a degree to which products are displayed in line with a front most position of the state monitoring area, based on the product detection image generated by product detector 33, and the product present section detected by product present section detector 45. Specifically, as shown in FIG. 12(B), first, the front-end white pixel distance at each of positions ($x_0$ to $x_B$) in the horizontal direction in the product present section is obtained. Next, the front-end white pixel distance is compared with a predetermined threshold value, a section in which the front-end white pixel distance is smaller than the threshold value, that is, a section in which the white pixel located at the front most side is located on the front side of the position defined by the threshold value is detected as an "appropriate section", and the width (the number of pixels) A of the appropriate section is obtained. The threshold value may be appropriately set, but it may be set to, for example, 10% of the length in the longitudinal direction of the state monitoring area.

Then, the face-up degree F. is calculated as the ratio of the sum of the widths A of the appropriate sections to the sum of the widths B of the product present sections, as the following equation.

$$F = \sum_{i=1}^{m} A_i \bigg/ \sum_{j=1}^{n} B_j \quad \text{(Equation 5)}$$

Here, in Equation 5, in a case where there are n product present sections and there are a total of m appropriate sections in each product present section, $A_i$ is the width of the i-th appropriate section, and $B_j$ is the width of the j-th product present section.

If the face-up degree F. is calculated in this way and the ratio of the appropriate section to the product present section is high, that is, there are a lot of products displayed in line with the front most position of the state monitoring area, the face-up degree F. is increased.

Figure 13:
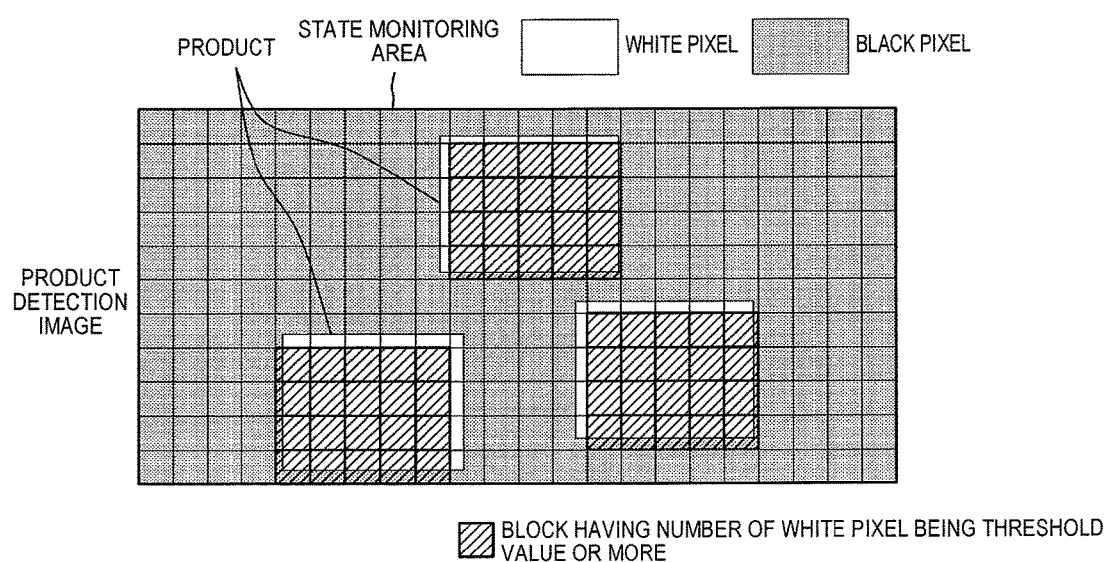
FIG. 13 is an explanatory diagram for explaining the outline of an occupancy calculation process performed by occupancy calculator 49.

Next, processes executed by occupancy calculator 49 illustrated in FIG. 6 will be described. FIG. 13 is an explanatory diagram for explaining the outline of an occupancy calculation process performed by occupancy calculator 49.

Occupancy calculator 49 calculates an occupancy representing the degree (ratio) to which the product occupies in the state monitoring area, based on the product detection image generated by product detector 33. Specifically, the product detection image is divided into a plurality of blocks, and white pixels in each block are counted. Then, a block in which the number of white pixels is a predetermined threshold value or more is extracted, and the ratio of the number of extracted blocks to the total number of blocks is determined as an occupancy.

Figure 14:
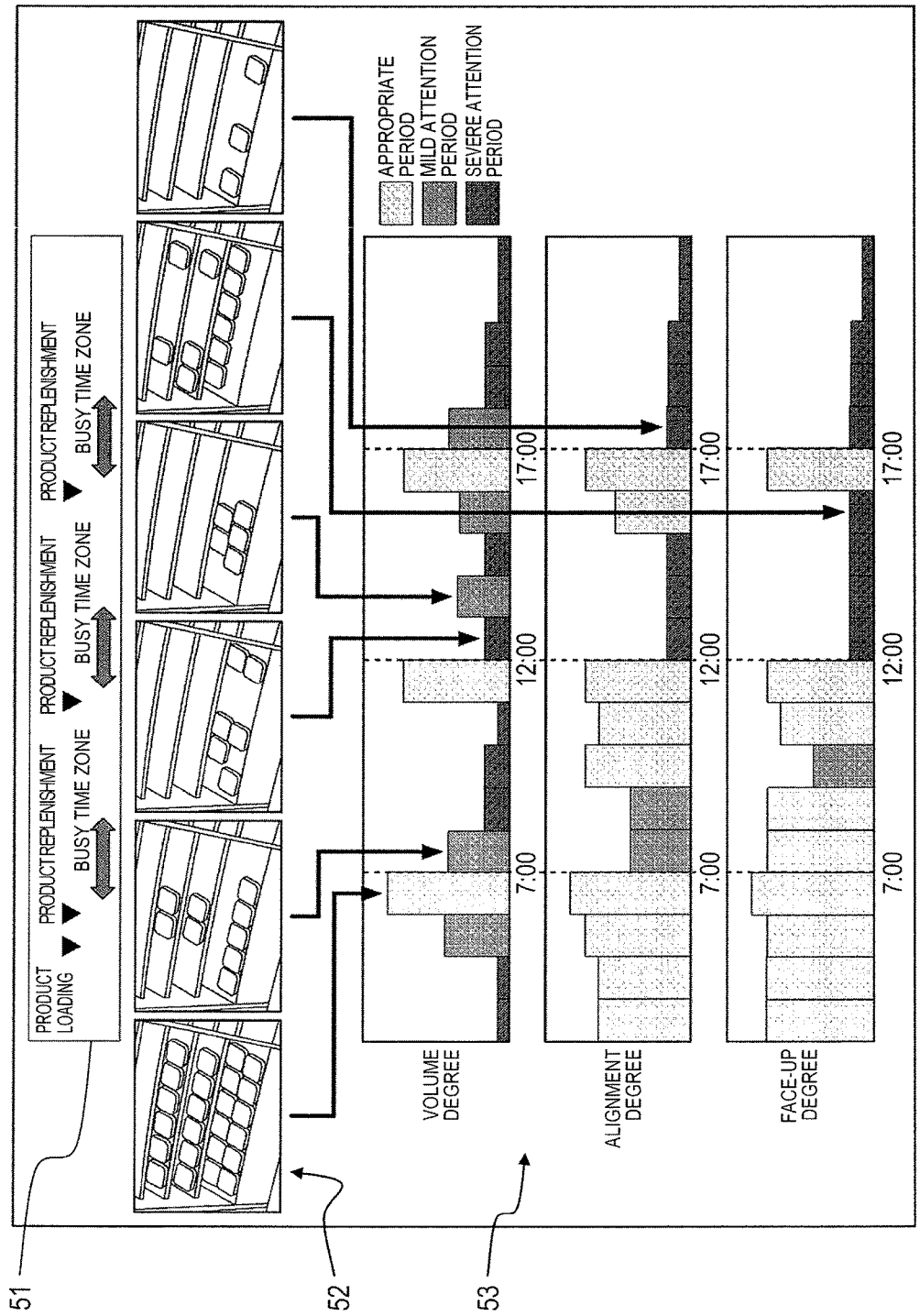
FIG. 14 is an explanatory diagram illustrating an analysis information display screen displayed on monitor 7.
Figure 15:
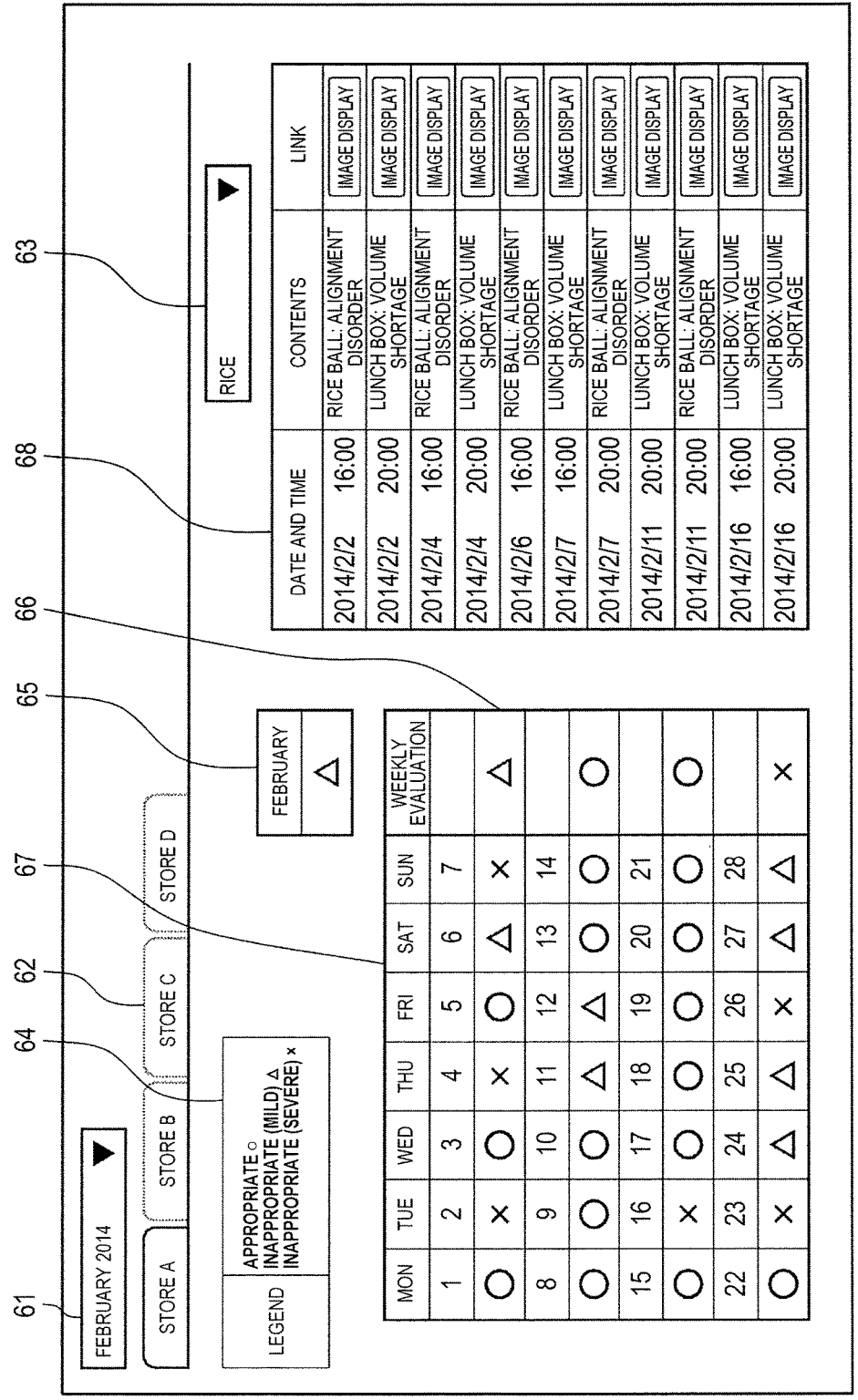
FIG. 15 is an explanatory diagram illustrating an analysis information display screen displayed on monitor 7.

Next, an analysis information display screen displayed on monitor 7 illustrated in FIG. 1 will be described. FIG. 14, FIG. 15, and FIG. 16 are explanatory diagrams illustrating an analysis information display screen displayed on monitor 7.

The analysis information display screen shown in FIG. 14 displays the analysis information representing the temporal transition status of the evaluation result on the display state of the product, and the attention period during which it is necessary to call attention to the user regarding the display state of the product. The analysis information display screen is provided with store status display portion 51, captured image display portion 52, and time chart display portion 53.

Information on the status in the store, that is, the product loading status related to the inventory status of the product in the store, the salesperson work status related to the display state of the product, and the status of customers visiting the store is displayed in store status display portion 51. In the example shown in FIG. 14, a timing at which the loading and replenishment of products are performed, and a busy time zone during which the number of customers entering the store is increased are displayed. Note that it is possible to determine the inventory status of products in the store from the loading timing of product, but information on the inventory status of products in the store may be displayed.

The captured image of the state monitoring area is displayed in captured image display portion 52. Captured image display portion 52 is used to check the actual status of the state monitoring area in the time zone in which the user has focused in the time chart displayed in time chart display portion 53, for example, the captured image of the selected time zone is displayed by selecting the time zone in time chart display portion 53. Display information generation unit 37 (see FIG. 6) may select the time zone which is the attention period, and the captured image of the selected time zone may be displayed.

In time chart display portion 53, an evaluation result of the product display state for each time zone, that is, a time chart representing the temporal transition status of the values of evaluation indices (volume degree, alignment degree, and face-up degree) is displayed. In the example shown in FIG. 14, as a time chart, the volume degree, the alignment degree, and the face-up degree for each time zone are displayed as bar graphs. The bar graph is displayed in three different colors of three stages of an appropriate period, a mild attention period, and a severe attention period, according to the level of each value of the volume degree, the alignment degree, and the face-up degree.

Here, in the present exemplary embodiment, evaluation result analyzer 36 (see FIG. 6) compares the value of each evaluation index (such as a volume degree) with a predetermined threshold value, and determines an appropriate period, a mild attention period, and a severe attention period. Evaluation result analysis unit 36 detects the continuation of the inappropriate display state for a long time as a caution event, and may display the occurrence timing of the caution event on the analysis information display screen shown in FIG. 14. At this time, in a case where the duration of the inappropriate display state exceeds a predetermined threshold value, it can be determined as a caution event.

Thus, since the evaluation result by a plurality of evaluation indices is displayed on the analysis information display screen shown in FIG. 14, the user can easily check whether or not the product management work corresponding to each evaluation index has been properly performed. In particular, in time chart display portion 53, the temporal transition status of the evaluation result of the product display state is displayed, so it is possible to clearly recognize a timing at which the product management work has a problem. By comparing the values of evaluation indices with each other, it is possible to clearly recognize which work item of the product management work has a problem.

Since the status in the store, that is, a product loading timing, a busy time zone, or the like are displayed in store status display portion 51 on the analysis information display screen, it is possible to make determination according to the actual situation in the store. In other words, it is possible to determine whether a necessary executable work has been properly implemented by considering the possibility of work from the situation in the store.

For example, because the inventory of product is low in the time zone in which a long time has elapsed from the product loading timing, the product replenishment work cannot be performed sufficiently, it is unavoidable that the volume degree is decreased, the product arranging work is possible, and here, if the alignment degree or the face-up degree remains reduced, it can be pointed out that product arranging work is negligent. On the other hand, since the inventory of the product is sufficient immediately after the loading timing of products, if the volume degree remains low, it can be pointed out that product replenishment work is negligent.

Specifically, as shown in FIG. 14, in the time zone of 7 o'clock, a large number of products are purchased because it is a busy time zone, it is unavoidable that the display state temporarily deteriorates, but the alignment degree and the face-up degree are not decreased a lot, such that it can be seen that the product arranging work is promptly performed.

On the other hand, in the time zone of 15 o'clock, the alignment degree is increased, it is recognized that the product arranging work is performed, but at this time, if the face-up degree remains low, it can be pointed out that face up is insufficient in the product arranging work.

In the time zone of 17 o'clock, a large number of products are purchased because it is a busy time zone, it is unavoidable that the display state temporarily deteriorates, the product arranging work is possible, but the alignment degree and the face-up degree remain reduced, such that it can be pointed out that the product arranging work is negligent.

In this way, the store manager can determine whether or not necessary and executable work has been properly performed by viewing the analysis information display screen shown in FIG. 14, thereby instructing the salesperson to perform an appropriate and specific improvement work.

The analysis information display screen shown in FIG. 15 displays the analysis information obtained by aggregating the evaluation results on the display state of a product in units of predetermined aggregation periods, and is provided with year and month selection portion 61, store selection portion 62, display area selection portion 63, legend display portion 64, monthly evaluation result display portion 65, weekly evaluation result display portion 66, daily evaluation result display portion 67, and detailed display portion 68.

In year and month selection portion 61, the user selects year and month. Here, year and month can be selected from a pull down menu. In store selection portion 62, the user selects a store. Here, store can be selected by using a tab provided for each store. In display area selection portion 63, the user selects the display area. Here, the user can select the display area from the pull-down menu.

In legend display portion 64, evaluation marks (○, Δ and x) displayed in evaluation result display portions 65 to 67 are described. In the example shown in FIG. 15, a comprehensive evaluation result summarizing the evaluation results based on the evaluation index of each of the volume degree, the alignment degree, and the face-up degree is displayed in three stages, "○" is displayed in the case of an appropriate display state (appropriate state), "Δ" is displayed in the case of a display state (mild disorder state) in which an inappropriate degree is low, and "x" is displayed in the case of a display state (severe disorder state) in which an inappropriate degree is high.

Here, the determination as to the evaluation mark, that is, the determination as to three states of an appropriate state, a mild disorder state, and a severe disorder state is made by display state evaluator 34 (see FIG. 6) comparing the value of each evaluation index with the predetermined threshold value. In addition, monthly, weekly and daily evaluation marks are determined by evaluation result analyzer 36 aggregating the state determination results by display state evaluator 34.

In monthly evaluation result display portion 65, an evaluation mark relating to the display state of the designated month is displayed. In weekly evaluation result display portion 66, an evaluation mark relating to the display state of each week is displayed. In daily evaluation result display portion 67, the evaluation mark relating to the display state of each day is displayed.

In detailed display portion 68, the evaluation results of the time zones in which the inappropriate display state occurs are listed. In the example shown in FIG. 15, the date and time at which the inappropriate display state occurs, the contents of the inappropriate display state, that is, the name of the state monitoring area where the inappropriate display state occurs, and the words explaining the inappropriate display state are displayed. A button "image display" is provided, and a screen, not shown, displaying the captured image of the state monitoring area is displayed by operating the button.

In this way, on the analysis information display screen shown in FIG. 15, since the evaluation results of the display state for each day, week, and month are displayed in evaluation result display portions 65 to 67, it is possible to recognize the quality of the display state at a glance. Since the evaluation results of the time zones having inappropriate display states are listed in detailed display portion 68, it is possible to check in detail, the display state of a period during which the evaluation mark "x" or "Δ" is displayed in evaluation result display portions 65 to 67.

The analysis information display screen shown in FIG. 16 displays analysis information representing the temporal transition status of the evaluation result on the designated evaluation index. Date selection portion 71, store selection portion 72, display area selection portion 73, captured image display portion 74, evaluation index selection portion 75, and time chart display portion 76 are provided on the analysis information display screen.

The user selects a date in date selection portion 71. Here, it is possible to select a date on a calendar screen, not shown, which is displayed by operating "Calendar" button. The user selects a store in store selection portion 72. Here, store can be selected by using a tab provided for each store. In display area selection portion 73, the user selects the display area. Here, the user can select the display area from the pull-down menu.

In captured image display portion 74, the captured image of a display area selected in display area selection portion 73 is displayed. In the example shown in FIG. 16, a plurality of state monitoring areas are set on the display area, and frame images 78 representing the state monitoring areas are displayed on the captured image. Frame image 78 is colored differently according to the evaluation result of the display state.

In evaluation index selection portion 75, the user selects one of the volume degree, the alignment degree, and the face-up degree, as the evaluation index. In this case, the user can select evaluation index from the pull-down menu. In the example of FIG. 16, the volume degree is selected.

In time chart display portion 76, a time chart representing the temporal transition status of the evaluation result related to the evaluation index selected in evaluation index selection portion 75 is displayed. In the example shown in FIG. 16, as a time chart, the volume degree for each time zone in one day is represented by a line graph, the horizontal axis is a time and the vertical axis is a volume degree (%).

In time chart display portion 76, slider (display time adjustment portion) 77 is provided so as to be movable in the time axis direction of the time chart, and it is possible to switch the captured images displayed in captured image display portion 74 to the captured image at the desired time, by operating slider 77. Specifically, when slider 77 is shifted using input device 6 such as a mouse, the captured image at the time indicated by slider 77 is displayed in captured image display portion 74.

Thus, since a time chart representing the transition status of the evaluation result for each time zone in one day is displayed on the analysis information display screen shown in FIG. 16, it is possible to check in detail the evaluation result of the day on which the display state has a problem on the analysis information display screen shown in FIG. 15, and examine the factor that the evaluation result becomes low. Since the captured image of the state monitoring area is displayed in the captured image display portion 74, it is possible to examine the factor that the evaluation result becomes low while checking the actual status of the state monitoring area.

Although the time chart of each of the volume degree, the alignment degree, and the face-up degree is displayed in the example shown in FIG. 16, the time chart of the occupancy may be displayed.

FIG. 14, FIG. 15 and FIG. 16 illustrates an example in which a screen displaying analysis information is displayed on monitor 7, but printer 8 may be caused to output a form having the same content as this.

As described above, in the present exemplary embodiment, image acquirer 31 acquires the captured image of the display area, state monitoring area setter 32 sets a state monitoring area on the captured image of the display area, product detector 33 acquires product detection information indicating a position of a product in the state monitoring area, based on a captured image of the state monitoring area, display state evaluator 34 evaluates a display state of the product in the state monitoring area, using a plurality of evaluation indices relating to display disorder of the product, based on the product detection information, and display information generator (evaluation information presentator) 37 presents information on an evaluation result by display state evaluator 34 to a user. According to this, since the evaluation result based on a plurality of evaluation indices regarding the display disorder of products is presented to the user, the user can recognize specific work items of the product management work for improving the inappropriate display state.

In the present exemplary embodiment, it is assumed that display state evaluator 34 performs evaluation by using at least two of a volume degree indicating a degree to which a large number of products are collectively displayed, an alignment degree indicating a degree to which products are aligned and displayed in a horizontal direction, and a face-up degree indicating a degree to which products are displayed in line with a front most position of the state monitoring area, as the evaluation indices. According to this, since the evaluation results on the volume degree, the alignment degree, and the face-up degree are presented to the user, the user can recognize which one of the volume degree, the alignment degree, and the face-up degree needs to be increased.

In the present exemplary embodiment, product detector 33 converts the captured image of the state monitoring area into a top view image, and acquires product detection information, from the top view image. According to this, it is possible to properly perform the product detection process, without being influenced by a difference in the appearances of a product in different images depending on the position relationship between the product and camera 1.

In the present exemplary embodiment, evaluation result analyzer 36 generates analysis information representing an attention period, based on an evaluation result by display state evaluator 34, and display information generator (evaluation informationpresentator) 37 presents analysis information to the user. According to this, the user can immediately recognize an attention period, that is, a period during which it is necessary to call attention to the user regarding the display state of a product.

In the present exemplary embodiment, evaluation result analyzer 36 performs a statistical process on an evaluation result by display state evaluator 34 and generates analysis information representing a temporal transition status of the evaluation result, and display informationgenerator (evaluation informationpresentator) 37 presents analysis information to the user. According to this, since the analysis information representing a temporal transition status of the evaluation result is presented to the user, the user can clearly recognize a timing at which there is a problem in the product display state and the product management work.

In the present exemplary embodiment, state monitoring area setter 32 sets a state monitoring area for each section obtained by dividing the display area, based on an operation input by the user, and the display state evaluator evaluates the display state of the product for each of a plurality of the state monitoring areas. According to this, since the user designates the state monitoring area for each section obtained by dividing the display area by the shelf board of the display shelf or the category of a product, according to the necessity of work management, the evaluation result of the product display state for each section can be obtained.

The present exemplary embodiment is configured such that image acquirer 31 acquires a privacy mask image in which an image of a person is deleted from an original captured image of the display area, as the captured image of the display area. According to this, it is possible to avoid a problem that the product detection information cannot be appropriately acquired due to the image of the person appearing in the captured image of the display area.

Although the present disclosure has been described based on specific exemplary embodiments, these exemplary embodiments are merely examples, and the present disclosure is not limited by these exemplary embodiments. In addition, all the constituent elements of a product monitoring device, a product monitoring system, and a product monitoring method according to the present disclosure described in the above exemplary embodiments are not necessarily indispensable, and can be selected as appropriate at least without departing from the scope of the present disclosure.

For example, in the present exemplary embodiment, as shown in FIG. 2, cameras 1 is an omnidirectional camera capable of imaging a wide range, but without being limited thereto, a box-type cameras whose viewing angle is limited.

In the present exemplary embodiment, the display state of the product is evaluated only by the position of the product in the state monitoring area, but the display state of the product may be evaluated by detecting the inclination, turning over, falling of the product, or the like.

In the present exemplary embodiment, a device installed in the store may be configured to execute the processes required for the product monitoring, but as illustrated in FIG. 1, the required processes may be executed by PC 11 installed in the head office or cloud computer 12 constituting a cloud computing system. The necessary processes may be shared by a plurality of information processing devices, and information may be transferred between the plurality of information processing devices through a communication medium such as an IP network or a LAN, or a storage medium such as a hard disk or a memory card. In this case, a product monitoring system is configured with a plurality of information processing devices that share required processes.

Particularly, in the system configuration including cloud computer 12, in addition to PCs 3 and 11 provided at the stores and head offices, necessary information may be displayed on portable terminal (such as a smartphone or a tablet terminal) 13 which is network-connected to cloud computer 12, such that analysis information can be viewed at any place such as a place to go outside in addition to stores and head offices.

In the above exemplary embodiment, recorder 2 that accumulates the image captured by camera 1 is installed in the store, but when the processes necessary for the product monitoring are performed by PC 11 or cloud computer 12 installed in head office, the captured image from camera 1 may be sent to the head office or the management facility of the cloud computing system, and the captured image may be accumulated in the device installed therein.

INDUSTRIAL APPLICABILITY

A product monitoring device, a product monitoring system, and a product monitoring method according to the present disclosure have an effect capable of presenting to the user, information by which the user can recognize specific work items of a product management work for improving an inappropriate display state, based on the captured image of the interior of the store, and are useful as a product monitoring device, a product monitoring system, and a product monitoring method, which monitor the display status of a product, based on the captured image of the display area in the store.

REFERENCE MARKS IN THE DRAWINGS

1 CAMERA
2 RECORDER
3 PC (PRODUCT MONITORING DEVICE)
4 PORTABLE TERMINAL
6 INPUT DEVICE
7 MONITOR

8 PRINTER
11 PC
12 CLOUD COMPUTER
13 PORTABLE TERMINAL
31 IMAGE ACQUIRER
32 STATE MONITORING AREA SETTER
33 PRODUCT DETECTOR
34 DISPLAY STATE EVALUATOR
35 EVALUATION RESULT STORAGE
36 EVALUATION RESULT ANALYZER
37 DISPLAY INFORMATION GENERATOR (EVALUATION INFORMATION PRESENTATOR)
42 TOP VIEW CONVERTER
43 PRODUCT DETECTION IMAGE GENERATOR
45 PRODUCT PRESENT SECTION DETECTOR
46 VOLUME DEGREE CALCULATOR
47 ALIGNMENT DEGREE CALCULATOR
48 FACE-UP DEGREE CALCULATOR
49 OCCUPANCY CALCULATOR

The invention claimed is:

1. A product monitoring device which monitors a display status of a product, comprising:
a memory that stores instructions; and
a processor that, when executing the instructions stored in the memory, performs operations comprising:
acquiring a captured image of a display area in a store;
setting a state monitoring area on the captured image of the display area;
acquiring product detection information indicating a position of a product in the state monitoring area, based on a captured image of the state monitoring area;
evaluating a display state of the product in the state monitoring area, using a plurality of evaluation indices relating to display disorder of the product, based on the product detection information; and
presenting, on a display screen, information on an evaluation result of the display state of the product,
wherein the presenting information on the evaluation result includes:
presenting a time chart that includes a first axis and a second axis, the first axis indicating a plurality of time periods in a chronological order, the second axis indicating respective evaluation results of the product display state of the product for the plurality of time periods of the first axis, and
presenting a product loading time that is shown in synchronization with a time period in the time chart of the first axis, the product loading time indicating a time when the product is loaded into store inventory, the product being loaded into an area different from the display area and not being included in the captured image.

2. The product monitoring device according to claim 1, wherein the evaluation is performed by using at least two of a volume degree, indicating a degree to which a large number of products are collectively displayed, an alignment degree, indicating a degree to which products are aligned and displayed in a horizontal direction, and a face-up degree, indicating a degree to which products are displayed in line with a front most position of the state monitoring area, as the evaluation indices.

3. The product monitoring device according to claim 1, wherein, in the acquiring of the product detection information, the captured image of the state monitoring area is converted into a top view image, and the product detection information is acquired from the top view image.

4. The product monitoring device according to claim 1, wherein the processor further performs operations comprising:
generating analysis information representing an attention period, based on the evaluation result, and
presenting, on the display screen, the analysis information to the user.

5. The product monitoring device according to claim 1, wherein the processor further performs operations comprising:
performing a statistical process on the evaluation result,
generating analysis information representing a temporal transition status of the evaluation result, and
presenting, on the display screen, the analysis information to the user.

6. The product monitoring device according to claim 1,
wherein, in the setting, a plurality of state monitoring areas are set in the display area based on an operation input by the user, and
wherein, in the evaluating, a display state of a product in each of the plurality of the state monitoring areas is evaluated.

7. The product monitoring device according to claim 1, wherein, in the acquiring of the captured image of the display area, a privacy mask image is acquired as the captured image of the display area, the privacy mask image being obtained by deleting an image of a person from an original image obtained by capturing an image of the display area.

8. A product monitoring system which monitors a display status of a product, comprising:
a camera that captures an image of the display area in a store; and
a plurality of information processing devices,
wherein one of the plurality of information processing device includes a processor that, when executing instructions stored in a memory, performs operations comprising:
acquiring the captured image of the display area;
setting a state monitoring area on the captured image of the display area;
acquiring product detection information indicating a position of a product in the state monitoring area, based on a captured image of the state monitoring area;
evaluating a display state of the product in the state monitoring area, using a plurality of evaluation indices relating to display disorder of the product, based on the product detection information; and
presenting, on a display screen, information on an evaluation result of the display state of the product,
wherein the presenting information on the evaluation result includes:
presenting a time chart that includes a first axis and a second axis, the first axis indicating a plurality of time periods in a chronological order, the second axis indicating respective evaluation results of the product display state of the product for the plurality of time periods of the first axis, and
presenting a product loading time that is shown in synchronization with a time period in the time chart of the first axis, the product loading time indicating a time when the product is loaded into store inventory, the product being loaded into an area different from the display area and not being included in the captured image.

9. A product monitoring method causing an information processing device to implement a process of monitoring a display status of a product, the method comprising:

acquiring a captured image of a display area in a store;

setting a state monitoring area on the captured image of the display area;

acquiring product detection information indicating a position of a product in the state monitoring area, based on a captured image of the state monitoring area;

evaluating a display state of the product in the state monitoring area, using a plurality of evaluation indices relating to display disorder of the product, based on the product detection information; and presenting, on a display screen, information on an evaluation result of the display state of the product, wherein the presenting information on the evaluation result includes:

presenting a time chart that includes a first axis and a second axis, the first axis indicating a plurality of time periods in a chronological order, the second axis indicating respective evaluation results of the product display state of the product for the plurality of time periods of the first axis, and presenting a product loading time that is shown in synchronization with a time period of the first axis in the time chart, the product loading time indicating a time when the product is loaded into store inventory, the product being loaded into an area different from the display area and not being included in the captured image.

* * * * *